(12) United States Patent
Rieger et al.

(10) Patent No.: US 8,393,239 B2
(45) Date of Patent: *Mar. 12, 2013

(54) DOUBLE CLUTCH TRANSMISSION

(75) Inventors: Wolfgang Rieger, Friedrichshafen (DE); Matthias Reisch, Ravensburg (DE); Juergen Wafzig, Eriskirch (DE); Philip Recker, Friedrichshafen (DE); Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 456 days.

This patent is subject to a terminal disclaimer.

(21) Appl. No.: 12/758,982

(22) Filed: Apr. 13, 2010

(65) Prior Publication Data

US 2010/0257964 A1 Oct. 14, 2010

(30) Foreign Application Priority Data

Apr. 14, 2009 (DE) .......................... 10 2009 002 354

(51) Int. Cl.
*F16H 3/08* (2006.01)

(52) U.S. Cl. ........................................................ 74/330

(58) Field of Classification Search .................... 74/330, 74/333, 340
See application file for complete search history.

(56) References Cited

U.S. PATENT DOCUMENTS

| 6,869,379 | B2 * | 3/2005 | Voss et al. ..................... 475/218 |
| 7,066,043 | B2 * | 6/2006 | Kim et al. ...................... 74/330 |
| 7,225,696 | B2 * | 6/2007 | Gitt ................................ 74/340 |
| 7,597,644 | B2 * | 10/2009 | Rodgers, II ................... 475/218 |
| 7,604,561 | B2 * | 10/2009 | Earhart .......................... 475/218 |
| 7,604,565 | B2 * | 10/2009 | Lee et al. ........................... 477/3 |
| 8,051,732 | B2 * | 11/2011 | Gitt ................................ 74/331 |
| 2005/0000307 | A1 | 1/2005 | Gumpoltsberger |
| 2009/0036247 | A1 * | 2/2009 | Earhart et al. .................. 475/35 |

FOREIGN PATENT DOCUMENTS

| DE | 38 22 330 A1 | 7/1989 |
| DE | 100 15 336 A1 | 10/2001 |
| DE | 103 05 241 A1 | 9/2004 |
| DE | 10 2004 001 961 A1 | 8/2005 |
| DE | 10 2005 028 532 A1 | 12/2006 |
| DE | 10 2007 049 257 A1 | 4/2009 |
| DE | 10 2007 049 259 A1 | 4/2009 |
| DE | 10 2007 049 260 A1 | 4/2009 |
| DE | 10 2007 049 263 A1 | 4/2009 |
| DE | 10 2007 049 264 A1 | 4/2009 |
| DE | 10 2007 049 265 A1 | 4/2009 |
| DE | 10 2007 049 266 A1 | 4/2009 |
| DE | 10 2007 049 267 A1 | 4/2009 |
| DE | 10 2007 049 269 A1 | 4/2009 |
| DE | 10 2007 049 270 A1 | 4/2009 |

\* cited by examiner

*Primary Examiner* — Ha D. Ho

(74) *Attorney, Agent, or Firm* — Davis & Bujold, PLLC

(57) ABSTRACT

A double clutch transmission with two clutches (K1, K2) having input sides connected to a drive shaft (w_an) and output side connected to one of two coaxially arranged transmission input shafts (w_k1, w_k2). At least two countershafts (w_v1, w_v2) are provided on which toothed idler gearwheels (7, 8, 9, 10, 13, 14, 15) are situated in a rotatable manner. Toothed idler gearwheels (1, 2, 3, 4) are provided in a rotationally fixed manner on the two transmission input shafts (w_k1, w_k2). At least a plurality of forward gears which are power shiftable (1, 2, 3, 4, 5, 6, 7, 8) and at least one reverse gear (R1, R2, R3, R4, R5, R6, R7, R8) are shiftable. A maximum of five gear planes (7-13, 8-14, 9-15, 10-4) are provided so that at least one power shiftable winding path gear (G1, G8, R4) is shiftable by at least one shift element (P).

8 Claims, 30 Drawing Sheets

Fig. 2

| G | ZS | K1 | K2 | A | B | C | D | E | F | G | H | O | P | S_ab1 | S_ab2 |
|---|---|---|---|---|---|---|---|---|---|---|---|---|---|---|---|
| G1 | i3i4i2 | 1 | | 1 | | | | | | | | | | 1 | 1 |
| G2 | i2 | | 1 | 1 | | | | | | | | | | 1 | 1 |
| G3 | i3 | 1 | | | 1 | | | | | | | | | 1 | 1 |
| G4 | i4 | | 1 | | | | 1 | | | | | | | 1 | 1 |
| G5 | i5 | 1 | | | | 1 | | | | | | | | 1 | 1 |
| G6 | i6 | | 1 | | 1 | | | | | | | | | 1 | 1 |
| G7 | i7 | 1 | | | | | | 1 | | | | | | 1 | 1 |
| G8 | i4i3i7 | | 1 | | | | | 1 | | | | | 1 | | 1 |
| R-GEAR | | | | | | | | | | | | | | | |
| R1 | iR | 1 | 1 | | | | | | | | | | | | 1 |
| R2 | iRx8i5 | | 1 | | | | 1 | | | | | | | 1 | |
| R3 | i5i6iR | 1 | 1 | | | | | | 1 | | | | | | 1 |
| R4 | i3i4iR | 1 | 1 | | | | | | 1 | | | | | | 1 |
| R5 | i7i6iR | 1 | 1 | | | | | | 1 | | | | | | 1 |
| R6 | i2i5x8 | | 1 | | | | 1 | | | | 1 | | | 1 | |
| R7 | i2i7x8 | | 1 | | | | 1 | | | | 1 | | | 1 | |
| R8 | iRx8i5 | 1 | 1 | | | | 1 | | | | | | | | 1 |
| CRAWLER | | | | | | | | | | | | | | | |
| C1 | i2i5i3 | | 1 | 1 | | | 1 | | | | | | | | 1 |
| C2 | i2i7i3 | | 1 | 1 | | | 1 | | | | | | | | 1 |
| C3 | i5i6i2 | | 1 | 1 | | 1 | | | | | | | | | 1 |
| OVERDRIVE | | | | | | | | | | | | | | | |
| O1 | i6i5i7 | | 1 | | | 1 | | | | | 1 | | | 1 | 1 |
| O2 | i7i2i4 | | 1 | | | 1 | | | | | | 1 | | 1 | 1 |

Fig. 4

| G | ZS | K1 | K2 | A | B | C | D | H | I | J | K | M | N |
|---|---|---|---|---|---|---|---|---|---|---|---|---|---|
| G1 | i_3 i_4 i_2 | 1 |  | 1 |  |  |  |  |  |  |  |  | 1 |
| G2 | i_2 |  | 1 | 1 |  |  |  |  |  |  |  |  |  |
| G3 | i_3 | 1 | 1 |  |  |  |  |  |  |  |  |  |  |
| G4 | i_4 |  | 1 |  |  |  |  |  |  | 1 |  |  |  |
| G5 | i_5 | 1 |  |  |  |  | 1 |  |  |  |  |  |  |
| G6 | i_6 |  | 1 |  | 1 |  |  |  |  |  |  |  |  |
| G7 | i_7 | 1 |  |  |  |  |  |  |  |  | 1 |  |  |
| G8 | i_8 |  | 1 |  |  | 1 |  |  |  |  |  |  |  |

R-GEAR

| R | ZS | K1 | K2 | A | B | C | D | H | I | J | K | M | N |
|---|---|---|---|---|---|---|---|---|---|---|---|---|---|
| R1 | i_R |  | 1 |  |  |  |  | 1 |  |  |  |  |  |
| R2 | i_5 i_8 iR | 1 |  |  |  |  |  | 1 |  |  |  | 1 |  |
| R3 | i_3 i_4 iR | 1 |  |  |  |  |  | 1 |  |  |  |  | 1 |

OVERDRIVE

| O | ZS | K1 | K2 | A | B | C | D | H | I | J | K | M | N |
|---|---|---|---|---|---|---|---|---|---|---|---|---|---|
| O1 | i_8 i_5 i_7 | 1 |  |  |  |  |  |  |  |  | 1 | 1 |  |
| O2 | i_4 i_3 i_7 | 1 |  |  |  |  |  |  |  |  | 1 | 1 | 1 |

| G | ZS | K1 | K2 | A | B | C | D | E | I | J | K | M | N |
|---|---|---|---|---|---|---|---|---|---|---|---|---|---|
| G1 | i_3_i_4_i_2 | 1 | | 1 | | | | | | | | | 1 |
| G2 | i_2 | | 1 | 1 | | | | | | | | | |
| G3 | i_3 | 1 | 1 | | | | | | | | | | |
| G4 | i_4 | | 1 | | | | | 1 | | | | | |
| G5 | i_5 | 1 | 1 | | | | | | 1 | | | | |
| G6 | i_6 | | 1 | | | | | | | 1 | | | |
| G7 | i_7 | 1 | 1 | | | | | | | | 1 | | |
| G8 | i_8 | | 1 | | 1 | | | | | | | | |

R-GEAR

| | | | | | | | | | | | | | |
|---|---|---|---|---|---|---|---|---|---|---|---|---|---|
| R1 | i_R | 1 | | | | 1 | | | | | | | |
| R2 | i_R_i_6_i_2 | 1 | | 1 | | | | | | | | | |
| R3 | i_R_i_6_i_8 | 1 | | | 1 | | | | | | | | |
| R4 | i_R_i_6_i_4 | 1 | | | | | 1 | | | | | | |
| R5 | i_4_i_3_i_R | | 1 | | | | 1 | | 1 | | | | 1 |

OVERDRIVE

| | | | | | | | | | | | | | |
|---|---|---|---|---|---|---|---|---|---|---|---|---|---|
| O1 | i_4_i_3_i_7 | | 1 | | | | | 1 | 1 | | | | 1 |

Fig. 6

| G | ZS | K1 | K2 | A | C | D | G | H | I | J | K | M | N |
|---|---|---|---|---|---|---|---|---|---|---|---|---|---|
| G1 | i_3·i_4·i_2 | 1 |  | 1 |  |  |  |  |  |  |  |  | 1 |
| G2 | i_2 |  | 1 | 1 |  |  |  |  |  |  |  |  |  |
| G3 | i_3 | 1 | 1 |  |  |  |  |  |  |  |  |  |  |
| G4 | i_4 |  | 1 |  |  |  |  |  | 1 |  |  |  |  |
| G5 | i_5 | 1 |  |  |  | 1 |  |  |  |  |  |  |  |
| G6 | i_6 |  | 1 |  |  |  |  | 1 |  |  |  |  |  |
| G7 | i_7 | 1 |  |  |  |  |  |  |  |  | 1 |  |  |
| G8 | i_8 |  | 1 |  | 1 |  |  |  |  |  |  |  |  |

R-GEAR

| | | | | | | | | | | | | | |
|---|---|---|---|---|---|---|---|---|---|---|---|---|---|
| R1 | i_R |  | 1 |  |  |  | 1 |  |  |  |  |  | 1 |
| R2 | i_5·i_8·i_R | 1 |  |  |  |  | 1 |  |  |  |  | 1 |  |
| R3 | i_3·i_4·i_R | 1 |  |  |  |  | 1 |  |  |  |  |  |  |

CRAWLER

| | | | | | | | | | | | | | |
|---|---|---|---|---|---|---|---|---|---|---|---|---|---|
| C1 | i_5·i_8·i_2 | 1 |  | 1 |  |  |  |  |  |  |  | 1 |  |

OVERDRIVE

| | | | | | | | | | | | | | |
|---|---|---|---|---|---|---|---|---|---|---|---|---|---|
| O1 | i_8·i_5·i_7 |  | 1 |  |  |  |  |  |  |  | 1 | 1 | 1 |
| O2 | i_4·i_3·i_7 |  | 1 |  |  |  |  |  |  |  | 1 | 1 | 1 |

Fig. 8

| G | ZS | K1 | K2 | A | B | C | D | E | F | G | H | O | P | S_ab1 | S_ab2 |
|---|---|---|---|---|---|---|---|---|---|---|---|---|---|---|---|
| G1 | i_3·i_4·i_2 | 1 | | | | | | 1 | | | | | 1 | 1 | 1 |
| G2 | i_2 | | 1 | | | | | 1 | | | | | | 1 | 1 |
| G3 | i_3 | 1 | | | | | | | 1 | | | | | 1 | 1 |
| G4 | i_4 | | 1 | | | | | | 1 | | | | | 1 | 1 |
| G5 | i_5 | 1 | | | | | 1 | | | | | | | 1 | 1 |
| G6 | i_6 | | 1 | 1 | | | | | | | | | | 1 | 1 |
| G7 | i_7 | 1 | | | | 1 | | | | | | | | 1 | 1 |
| G8 | i_8 | | 1 | | 1 | | | | | | | | | 1 | 1 |

R-GEAR

| R1 | i_R | 1 | | | | | | | | | 1 | | | 1 | 1 |
| R2 | i_6·i_7·i_R | | 1 | 1 | | | | | | | 1 | | | | 1 |

CRAWLER

| C1 | i_5·i_8·i_2 | 1 | | | 1 | | | 1 | | | | | | | 1 |

OVERDRIVE

| O1 | i_4·i_3·i_7 | | 1 | | 1 | | | 1 | | 1 | | | 1 | 1 | 1 |
| O2 | i_3·i_2·i_8 | 1 | | | 1 | | | 1 | | 1 | | | 1 | 1 | 1 | lsb.

| G | ZS | K1 | K2 | A | B | C | D | H | I | J | K | M | N |
|---|---|---|---|---|---|---|---|---|---|---|---|---|---|
| G1 | i_5 i_8 i_2 | 1 | | | | | | 1 | | | | | 1 |
| G2 | i_2 | | 1 | | | | | 1 | | | | | |
| G3 | i_3 | 1 | 1 | | | | 1 | | | | | | |
| G4 | i_4 | | 1 | | | 1 | | | | | | | |
| G5 | i_5 | 1 | 1 | | 1 | | | | | | | | |
| G6 | i_6 | | 1 | 1 | | | | | | 1 | | | |
| G7 | i_7 | 1 | 1 | | | | | | 1 | | | | |
| G8 | i_8 | | 1 | | | | | | | | 1 | | |

R-GEAR

| | | | | | | | | | | | | | | |
|---|---|---|---|---|---|---|---|---|---|---|---|---|---|---|
| R1 | i_R | | 1 | | 1 | | | | | | | | | |
| R2 | i_3 i_4 i_R | 1 | | | 1 | | | | | | | 1 | |
| R3 | i_5 i_8 i_R | 1 | | | 1 | | | | | | | | 1 |

OVERDRIVE

| | | | | | | | | | | | | | | |
|---|---|---|---|---|---|---|---|---|---|---|---|---|---|---|
| O1 | i_4 i_3 i_7 | | 1 | | | | | | | | 1 | 1 | |
| O2 | i_8 i_5 i_7 | | 1 | | | | | | | | 1 | | 1 |

Fig. 14

| G | ZS | K1 | K2 | B | C | D | E | G | H | I | J | M | N |
|---|---|---|---|---|---|---|---|---|---|---|---|---|---|
| G1 | i_5 i_8 i_2 | 1 | | | | | | 1 | | | | | 1 |
| G2 | i_2 | | 1 | | | | | 1 | | | | | |
| G3 | i_3 | 1 | | | | 1 | | | | | | | |
| G4 | i_4 | | 1 | | 1 | | | | | | | | |
| G5 | i_5 | 1 | | | | | | | | | 1 | | |
| G6 | i_6 | | 1 | | | | | | 1 | | | | |
| G7 | i_7 | 1 | | | | | 1 | | | | | | |
| G8 | i_8 | | 1 | | | | | | | 1 | | | |

R-GEAR

| | ZS | K1 | K2 | B | C | D | E | G | H | I | J | M | N |
|---|---|---|---|---|---|---|---|---|---|---|---|---|---|
| R1 | i_R | 1 | | 1 | | | | | | | | | |
| R2 | i_3 i_4 i_R | 1 | | 1 | | | | | | | | 1 | |
| R3 | i_5 i_8 i_R | 1 | | 1 | | | | | | | | | 1 |

OVERDRIVE

| | ZS | K1 | K2 | B | C | D | E | G | H | I | J | M | N |
|---|---|---|---|---|---|---|---|---|---|---|---|---|---|
| O1 | i_4 i_3 i_7 | 1 | | | | | 1 | | | | | 1 | |
| O2 | i_8 i_5 i_7 | | 1 | | | | 1 | | | | | | 1 |

| G | ZS | K1 | K2 | A | B | C | D | E | G | H | J | M | N |
|---|---|---|---|---|---|---|---|---|---|---|---|---|---|
| G1 | i_7ZW1i_2 | 1 | | | | | | | | 1 | | | 1 |
| G2 | i_2 | | 1 | | | | | | | 1 | | | |
| G3 | i_3 | 1 | | | | | 1 | | | | | | |
| G4 | i_4 | | 1 | 1 | | | | | | | | | |
| G5 | i_5 | 1 | | | | | 1 | | | | | | |
| G6 | i_6 | | 1 | | | | | | 1 | | | | |
| G7 | i_7 | 1 | | | | | | | | | 1 | | |
| G8 | i_8 | | 1 | | | 1 | | | | | | | |

R-GEAR

| R1 | i_R | | 1 | | 1 | | | | | | | | |
| R2 | i_5i_8i_R | 1 | | | 1 | | | | | | | | |
| R3 | i_7ZW1i_R | 1 | | | 1 | | | | | | | | 1 |

CRAWLER

| C1 | i_5i_8i_2 | | 1 | | | | | | | 1 | | 1 | |

OVERDRIVE

| O1 | i_8i_5i_7 | | 1 | | | | | | | | 1 | 1 | |

| G | ZS | K1 | K2 | A | B | C | D | E | G | J | K | M | N |
|---|---|---|---|---|---|---|---|---|---|---|---|---|---|
| G1 | i_7 ZW_1 i_2 | 1 | | | 1 | | | | | | | | 1 |
| G2 | i_2 | 1 | 1 | | 1 | | | | | | | | |
| G3 | i_3 | 1 | | | | 1 | | | | | | | |
| G4 | i_4 | 1 | 1 | 1 | | | | | | | 1 | | |
| G5 | i_5 | | 1 | | | | 1 | | | | | | |
| G6 | i_6 | | 1 | | | | | | 1 | | | | |
| G7 | i_7 | 1 | | | | | | | | 1 | | | |
| G8 | i_8 | | 1 | | | 1 | | | | | | | |

R-GEAR

| | | | | | | | | | | | | | |
|---|---|---|---|---|---|---|---|---|---|---|---|---|---|
| R1 | i_R | 1 | | | | | | 1 | | | | | |
| R2 | ZW_1 i_7 i_R | | 1 | | | | | 1 | | | | | 1 |

CRAWLER

| | | | | | | | | | | | | | |
|---|---|---|---|---|---|---|---|---|---|---|---|---|---|
| C1 | i_5 i_8 i_2 | 1 | | | 1 | | | | | | | 1 | |

OVERDRIVE

| | | | | | | | | | | | | | |
|---|---|---|---|---|---|---|---|---|---|---|---|---|---|
| O1 | i_8 i_5 i_7 | | 1 | | | | | | | 1 | | 1 | |

Fig. 20

| G | ZS | K1 | K2 | A | C | D | E | G | H | I | K | M | N |
|---|---|---|---|---|---|---|---|---|---|---|---|---|---|
| G1 | ZW1 i_6 i_2 | 1 |  |  |  |  |  | 1 |  |  |  |  | 1 |
| G2 | i_2 |  | 1 |  |  |  |  | 1 |  |  |  |  |  |
| G3 | i_3 | 1 | 1 |  |  | 1 |  |  |  |  |  |  |  |
| G4 | i_4 |  | 1 |  | 1 |  |  |  |  |  |  |  |  |
| G5 | i_5 | 1 |  |  |  |  | 1 |  |  |  |  |  |  |
| G6 | i_6 | 1 | 1 |  |  |  |  |  |  |  |  |  |  |
| G7 | i_7 | 1 |  |  |  |  |  |  |  |  | 1 |  |  |
| G8 | i_8 |  | 1 |  |  |  |  |  | 1 |  |  |  |  |

R-GEAR

| | | K1 | K2 | A | C | D | E | G | H | I | K | M | N |
|---|---|---|---|---|---|---|---|---|---|---|---|---|---|
| R1 | i_R |  | 1 | 1 |  |  |  |  |  |  |  |  |  |
| R2 | i_3 i_4 i_R | 1 | 1 | 1 |  |  |  |  |  |  |  |  |  |
| R3 | ZW1 i_6 i_R | 1 |  | 1 |  |  |  |  |  |  |  | 1 | 1 |

OVERDRIVE

| | | K1 | K2 | A | C | D | E | G | H | I | K | M | N |
|---|---|---|---|---|---|---|---|---|---|---|---|---|---|
| O1 | i_4 i_3 i_7 | 1 |  |  |  |  |  |  |  |  | 1 | 1 | 1 |
| O2 | i_6 ZW1 i_7 |  | 1 |  |  |  |  |  |  |  | 1 | 1 | 1 |

Fig. 22

| G | ZS | K1 | K2 | B | C | D | E | F | H | I | K | M | N |
|---|---|---|---|---|---|---|---|---|---|---|---|---|---|
| G1 | i_1 | 1 |   |   |   |   |   |   |   |   |   |   |   |
| G2 | i_2 |   | 1 | 1 |   |   |   |   |   |   |   |   |   |
| G3 | i_3 | 1 | 1 |   |   |   |   |   |   |   |   |   |   |
| G4 | i_4 |   | 1 |   |   | 1 |   |   |   |   |   |   |   |
| G5 | i_5 | 1 |   |   |   |   | 1 |   |   |   |   |   |   |
| G6 | i_6 |   | 1 |   |   |   |   | 1 |   |   |   |   |   |
| G7 | i_7 | 1 |   |   |   |   |   |   | 1 |   |   |   |   |
| G8 | i_6 ZW_8 i_7 |   | 1 |   |   |   |   |   |   | 1 | 1 | 1 | 1 |

| R-GEAR | | | | | | | | | | | | | | lsb. |
|---|---|---|---|---|---|---|---|---|---|---|---|---|---|---|
| R1 | iR |   | 1 |   | 1 |   |   |   |   |   |   |   |   |   |
| R2 | iR i_3 i_5 |   | 1 |   |   |   | 1 |   |   |   |   |   |   |   |
| R3 | iR i_3 i_1 |   | 1 |   |   |   |   | 1 |   |   |   |   |   |   |
| R4 | ZW_8 i_6 iR | 1 |   |   | 1 |   |   |   |   |   |   |   | 1 | 1 |

Fig. 24

| G | ZS | K1 | K2 | B | D | E | F | H | I | K | L | M | N |
|---|---|---|---|---|---|---|---|---|---|---|---|---|---|
| G1 | i_1 | 1 | | | | | 1 | | | | | | |
| G2 | i_2 | | 1 | 1 | | | | | | | | | |
| G3 | i_3 | 1 | | | 1 | | | | | | | | |
| G4 | i_4 | | 1 | 1 | | | | | | | | | |
| G5 | i_5 | 1 | | | | 1 | | | | | | | |
| G6 | i_6 | 1 | | | | | | 1 | | | | | |
| G7 | i_7 | 1 | | | | | | | 1 | | | | |
| G8 | i_6_ZW_8_i_7 | | 1 | | | | | | | 1 | | | 1 |

R-GEAR

| | | K1 | K2 | B | D | E | F | H | I | K | L | M | N |
|---|---|---|---|---|---|---|---|---|---|---|---|---|---|
| R1 | i_R | 1 | | | | | | | | | 1 | | |
| R2 | i_6_ZW_8_i_R | | 1 | | | | | | | | 1 | | 1 |

Fig. 26

| G | ZS | K1 | K2 | B | C | D | E | F | H | J | K | M | N |
|---|---|---|---|---|---|---|---|---|---|---|---|---|---|
| G1 | i_1 | 1 | | | | | | 1 | | | | | |
| G2 | i_2 | | 1 | | 1 | | | | | | | | |
| G3 | i_3 | 1 | | | | | 1 | | | | | | |
| G4 | i_4 | | 1 | 1 | | | | | | | | | |
| G5 | i_5 | 1 | | | | | | | | 1 | | | |
| G6 | i_6 | | 1 | | | | | | 1 | | | | |
| G7 | i_7 | 1 | | | | | | | | | 1 | | |
| G8 | ZW_8 i_3 i_7 | | 1 | | | | | | | | 1 | 1 | 1 |

R-GEAR

| | | | | | | | | | | | | | | lsb. |
|---|---|---|---|---|---|---|---|---|---|---|---|---|---|---|
| R1 | i_R | 1 | | | 1 | | | 1 | | | | | | |
| R2 | i_2 i_R i_1 | | 1 | | 1 | | | | | | | 1 | | |
| R3 | ZW_8 i_3 i_R | | 1 | | | | | | | | | | 1 | 1 |

Fig. 28

| G | ZS | K1 | K2 | B | C | E | F | H | J | K | L | M | N |
|---|---|---|---|---|---|---|---|---|---|---|---|---|---|
| G1 | i_1 | 1 |   |   |   |   |   |   |   |   |   |   |   |
| G2 | i_2 |   | 1 |   | 1 |   |   |   |   |   |   |   |   |
| G3 | i_3 | 1 |   |   |   |   |   |   | 1 |   |   |   |   |
| G4 | i_4 |   | 1 | 1 |   |   |   |   |   |   |   |   |   |
| G5 | i_5 | 1 |   |   |   | 1 |   |   |   |   |   |   |   |
| G6 | i_6 |   | 1 |   |   |   |   | 1 |   |   |   |   |   |
| G7 | i_7 | 1 |   |   |   |   |   |   |   | 1 |   |   |   |
| G8 | ZW_8i_3i_7 |   | 1 |   |   |   |   |   |   | 1 |   |   | 1 |

R-GEAR

| R1 | i_R | 1 |   |   |   |   |   |   |   |   | 1 |   |   |
| R2 | ZW_8i_3i_R |   | 1 |   |   |   |   |   |   |   | 1 | 1 | 1 |

Fig. 30

| G | ZS | K1 | K2 | B | C | D | E | H | I | K | L | M | N |
|---|---|---|---|---|---|---|---|---|---|---|---|---|---|
| G1 | i_1 | 1 | | | | 1 | | | | | | | |
| G2 | i_2 | | 1 | | | | | | | | | | |
| G3 | i_3 | 1 | | | | | | | | | | | |
| G4 | i_4 | | 1 | 1 | | | | | | | | | |
| G5 | i_5 | 1 | | | | | 1 | | | | | | |
| G6 | i_6 | | 1 | | | | | 1 | | | | | |
| G7 | i_7 | 1 | | | | | | | | | 1 | | |
| G8 | i_2·ZW_8·i_7 | | 1 | | | | | | | | 1 | | 1 |

R-GEAR

| | ZS | K1 | K2 | B | C | D | E | H | I | K | L | M | N |
|---|---|---|---|---|---|---|---|---|---|---|---|---|---|
| R1 | i_R | 1 | | | 1 | | | | | | | | |
| R2 | i_1·i_R·i_2 | 1 | | | | | | | | 1 | | 1 | |
| R3 | ZW_8·i_2·i_R | | 1 | | 1 | | | | | | | | 1 |

DOUBLE CLUTCH TRANSMISSION

This application claims priority from German patent application serial no. 10 2009 002 354.2 filed Apr. 14, 2009.

FIELD OF THE INVENTION

The present translation relates to a double clutch transmission.

BACKGROUND OF THE INVENTION

A six-speed or seven-speed double clutch transmission is known from published patent DE 103 05 241 A1. The double clutch transmission comprises two clutches which are each connected by their input sides with the drive shaft and by their output sides with one of the two transmission input shafts. The two transmission input shafts are arranged coaxially relative to each other. Furthermore, two countershafts are arranged parallel to the axis of the two transmission input shafts, of which the idler gears engage with fixed gears of the transmission input shafts. In addition, coupling devices are held in a rotationally fixed manner and movable on the countershafts to be able to shift the corresponding toothed gearwheels. Each chosen transmission ratio is transmitted to a differential by means of the output gears. To realize the desired transmission ratio stages in the known double clutch transmission, a multiplicity of gear planes is necessary so that a not insignificant amount of construction space is needed for installation.

Furthermore, a spur-gear multi-speed transmission is known from published patent DE 38 22 330 A1. The spur-gear multi-speed transmission comprises a power shiftable double clutch of which one part is connected to a drive shaft and of which another part is connected to a hollow drive shaft which is fixed in a rotational manner on the drive shaft. The drive shaft can be coupled with the hollow drive shaft by means of a shift element for certain transmission ratios.

A power-shift transmission with two clutches is known from published patent DE 10 2004 001 961 A1, in which the clutches are assigned to a subtransmission. The transmission input shafts of the two subtransmissions are arranged coaxially relative to each other and mesh with idler gears of the assigned countershafts by means of fixed gears. Each idler gear of the countershafts can be connected in a rotationally fixed manner to one of the countershafts by means of assigned shift elements. From this published patent, an eight-speed transmission is also known for which another shift element is provided for coupling the two transmission input shafts for the realization of a further transmission ratio stage. Even the seven-geared transmission requires at least six gear planes in the two subtransmissions in this embodiment to be able to realize the transmission ratio stages. This leads to an undesirable lengthening of the construction length in the axial direction so that the possibility of installation in a vehicle is significantly limited.

Furthermore, another power shiftable transmission is known from published patent DE 10 2005 028 532 A1, which comprises two input shafts and only one countershaft. An eight-speed transmission in this embodiment, for example, requires more than seven gear planes to be able to realize the transmission ratio stages, especially the reverse gear transmission ratios. This leads to an undesirable lengthening of the construction length in the axial direction.

SUMMARY OF THE INVENTION

The problem at the basis of the present invention is to propose a double clutch transmission of the type described at the beginning in which a plurality of power shiftable transmission ratio stages are realized as cost-effectively as possible and with the fewest parts with little demand for construction space.

Accordingly, a double clutch transmission optimized for construction space with two clutches is proposed, of which the input sides are connected to a drive shaft and of which the output sides are connected to one of, for example, two transmission input shafts arranged coaxially to each other. The double clutch transmission comprises at least two countershafts or the like, on which toothed gearwheels designed as idler gears are fixed in a rotatable manner, wherein toothed gearwheels are provided which are arranged in a rotationally fixed manner on the two transmission input shafts and designed as fixed gears, and the toothed gearwheels mesh at least partly with the idler gears. Furthermore, a plurality of coupling devices are provided for the connection in a rotationally fixed manner of an idler gear with a countershaft. The double clutch transmission according to the invention has a power take-off gear or constant pinion on each of the countershafts, each of which is coupled with a gearing of a drive shaft to connect each countershaft to the output drive, and at least one shift element for the connection in a rotationally fixed manner of two toothed gearwheels, wherein a plurality of power shiftable gears are feasible.

According to the invention, the proposed double clutch transmission comprises a maximum of only five gear planes, by which at least eight power shiftable gears are realized with little demand for construction space. The preferably four or five gear planes, for example, can be formed by at least three dual gear planes, among others, wherein one idler gear of the first and second countershafts is assigned to a fixed gear of one of the transmission input shafts in each dual gear plane and in at least one of the dual gear planes, at least one idler gear is usable for at least two gears, so that at least one winding path gear is shiftable by means of an activated winding path gear-shift element.

The four gear planes can be formed exclusively by dual gear planes, for example. It is also possible that at least one single gear plane also be used along with the dual gear planes, wherein in each single gear plane, one idler gear of the countershafts is assigned to one fixed gear of one of the transmission input shafts. Other combinations are also possible.

The proposed double clutch transmission makes it possible to realize a maximum number of transmission ratios with the least possible number of gear planes because of the possible multiple usages of idler gears, wherein preferably the first eight forward gears are power shiftable with sequential execution.

To optimize the stepping of the proposed double clutch transmission according to the invention, a dual gear plane can, for example, be replaced by two single gear planes, in that one fixed gear is replaced by two fixed gears. An especially harmonious, progressive gear stepping can thereby be achieved. It is also possible to replace two single gear planes by one dual gear plane.

The proposed double clutch transmission can preferably be embodied as an eight-speed transmission with at least eight power shiftable gear stages. Because of the short design relative to known transmission arrangements, the double clutch transmission according to the invention is especially suitable for a front-transverse design of a vehicle. However, other installations are also possible depending on the type and construction space situation of the specific vehicle.

The first and/or the eighth forward gear can preferably be a winding path gear in the proposed double clutch transmission. Also, at least one reverse gear and/or other gears, as e.g.

crawler gears or overdrive gears, can likewise be embodied as winding path gears and can possibly also be feasible as power shiftable. For example, the first power shiftable forward gear or the highest power shiftable gear can be a winding path gear. Along with the winding path gear-shift element arranged on the second countershaft, other winding path gear-shift elements can be optionally provided, for example in the form of a shift element assigned to the first or the second countershaft or in the form of winding path gear-coupling devices, which are assigned to the constant pinions almost as winding path gear-shift elements, in order to release these from the assigned countershaft to be able to realize other winding path gears. Thus, both constant pinions can optionally be connected to the assigned countershaft such that they are shiftable.

Three to five shiftable idler gears, for example, can be assigned on the first countershaft and on the second countershaft, depending on the embodiment, and engage with each fixed gear of the assigned transmission input shafts.

If the last or next-to-last gear increment is higher than the previous one, a downshift request by the driver can place an especially high output torque or drive power at his/her disposal.

The double clutch transmission according to the invention has an advantage in that a maximum of five shift points on the first countershaft and a maximum of six shift points on the second countershaft are needed. Overall, a maximum of nine shift points can be enough, however, to realize the proposed gear stages. Further shift points are, however, possible.

According to the invention, the idler gear of the second subtransmission can be connected to the idler gear of the first subtransmission by means of the at least one additional shift element on the first and/or second countershaft, so that at least one winding path gear can be shifted by means of the shift element.

Winding path gears can be realized on the output gears in the inventive double clutch transmission when the shift element is activated and, if needed, additionally when the coupling devices are disengaged, for which winding path gears and toothed gearwheels of both subtransmissions are coupled with each other to realize thereby a flow of power through both subtransmissions. The winding path gear-shift element used each time serves for the coupling of two idler gears and thereby brings the transmission input shafts into interdependence.

The arrangement of the shift elements for the coupling of two particular idler gears can be varied in the double clutch transmission so that the shift elements do not have to be arranged between the idler gears to be coupled. Accordingly, other positions of the order of each of the shift elements are conceivable to optimize, for example, the linking to an actuator system.

The double clutch transmission can provide, according to a possible embodiment, that three dual gear planes and one single gear plane, for example, be provided, wherein a first gear plane and a second gear plane are assigned to the fixed gears of the second transmission input shaft of the second subtransmission, and wherein a third gear plane and a fourth gear plane are assigned to the fixed gears of the first transmission input shaft of the first subtransmission.

The first gear plane and the second gear plane of the second subtransmission can be embodied as dual gear planes. The third gear plane of the first subtransmission is preferably embodied as a dual gear plane and the fourth gear plane of the first subtransmission can be embodied as a single gear plane.

As part of further embodiment of the invention, provision can be made for three dual gear planes and two single gear planes in the proposed double clutch transmission. The first gear plane as single gear plane, the second gear plane as dual gear plane and the fourth gear plane also as dual gear plane can be assigned to the fixed gears of the second transmission input shaft, for example, wherein a fourth gear plane as dual gear plane and a fifth gear plane as single gear plane can be assigned then to the first subtransmission. It is also conceivable that in this embodiment a first gear plane as single gear plane, a second gear plane as single gear plane and a third gear plane as dual gear plane be assigned to the second subtransmission, wherein then the fourth gear plane and the fifth gear plane each are assigned as dual gear planes to the first subtransmission. It is also conceivable that a first gear plane as dual gear plane, a second gear plane as single gear plane and a third gear plane as dual gear plane be assigned to the second subtransmission, wherein then the fourth gear plane as dual gear plane and the fifth gear plane as single gear plane can be assigned to the first subtransmission.

According to the next embodiment of the invention, provision can be made for only four dual gear planes. In this embodiment, a first gear plane and a second gear plane as dual gear planes can be assigned to the second subtransmission, and a third gear plane and a fourth gear plane also as dual gear planes can be assigned to the first subtransmission.

Provision can preferably be made in the double clutch transmission according to the invention for four dual gear planes and one single gear plane. In this embodiment, a first gear plane and a second gear plane, each as dual gear planes, can be assigned to the second subtransmission, for example. A third gear plane and a fourth gear plane, each as dual gear planes, and a fifth gear plane as single gear plane can be assigned, for example, to the first subtransmission. Alternatively, a third gear plane as single gear plane and a fourth gear plane as well as a fifth gear plane, each as dual gear planes, can be assigned to the first subtransmission. A further variant of this embodiment can provide that a first gear plane as dual gear plane and a second gear plane as single gear plane be assigned to the second subtransmission, for example. The third gear plane, the fourth gear plane and the fifth gear plane can be each assigned to the first subtransmission as dual gear planes in this embodiment.

Another embodiment of the invention can provide that, for four dual gear planes and one single gear plane, a first gear plane, a second gear plane and a third gear plane, each as dual gear plane, are assigned to the second subtransmission, wherein a fourth gear plane as dual gear plane and a fifth gear plane as single gear plane are assigned to the first subtransmission. Alternatively, a first gear plane as dual gear plane, a second gear plane as single gear plane and a third gear plane as dual gear plane can also be assigned to the second subtransmission, wherein then a fourth gear plane and a fifth gear plane each as dual gear planes are assigned to the first subtransmission.

To provide the necessary rotation reversal for the realization of reverse gears in the double clutch transmission according to the invention, at least one intermediate gear or the like can, for example, be used, which is arranged on an intermediate shaft, for example. It is also possible that one of the idler gears of a countershaft serve as intermediate gear for at least one reverse gear. Then, no additional intermediate shaft is necessary for the reverse gear transmission ratio since one of the idler gears engages with a fixed gear as well as with another shiftable idler gear of the other countershaft. The intermediate gear necessary for the reverse gear is thus arranged on a countershaft as shiftable idler gear and serves in addition for the realization of at least one other forward gear. The intermediate gear can also be embodied as stepped gear, independently of whether it is arranged on the countershaft or on an additional intermediate shaft. It is also possible that the intermediate gear not be arranged on one of the already present countershafts, but instead be provided on another separate shaft, e.g. a third countershaft.

To maintain the desired transmission ratio stages, the double clutch transmission can provide that at least one bidirectionally operative coupling device or the like be arranged on each countershaft. The provided coupling devices can connect one assigned idler gear in a rotationally fixed manner to each countershaft in the activated or engaged condition depending on the direction of activation. Moreover, a unidirectionally operative coupling device or the like can also be arranged on at least one of the countershafts. For example, hydraulically, electrically, pneumatically, or mechanically actuated clutches or also form-locking claw clutches as well as every type of synchronization can be used as coupling devices, which serve for the connection in a rotationally fixed manner of an idler gear to a countershaft. It is possible that a bidirectionally operative coupling device be replaced by two unidirectionally operative coupling devices or vice versa.

It is conceivable for the indicated potential arrangements of the toothed gearwheels to be varied and for the number of toothed gearwheels and the number of coupling devices to be changed in order to realize further savings in power-shifting gears or non-power-shifting gears and in construction space and parts in the proposed double clutch transmission. In particular, fixed gears of dual gear planes can be divided into two fixed gears for two single-gear planes. Step changes can thereby be improved. In addition, it is possible to exchange countershafts. The subtransmissions can also be exchanged, i.e. as mirror images around a vertical axis. In the process, hollow shaft and solid shaft are exchanged. It is thereby possible to arrange the smallest gear on the solid shaft, for example, to optimize the use of the available construction space further. In addition, adjacent gear planes can be exchanged, for example to optimize a shaft deflection and/or optimally connect a shift actuating system. Moreover, the order of the coupling devices' positions on the gear plane can be varied. Furthermore, the direction of action of the coupling devices can be changed.

The gear numbering used here has been loosely specified. It is also possible to add a crawler or creep speed and/or overdrive or fast speed to improve, for example, the off-road features or the acceleration response. In addition, a first gear can be omitted, for example, to be able to optimize the totality of the step changes. The gear numbering varies with these actions correspondingly.

Independent of the specific variant embodiments of the double clutch transmission, the drive shaft and the output shaft can by preference be arranged non-coaxially with each other, which produces a particularly space-saving arrangement. For example, the shafts thereby arranged spatially behind each other can be moved slightly toward each other. With this arrangement, a direct gear with transmission ratio of one can be realized by means of gear engagement and can be positioned advantageously and relatively freely on the sixth to ninth gears. Other possible arrangements of the drive shaft and the output shaft are also conceivable.

The proposed double clutch transmission is preferably equipped with an integrated output stage. The output stage can comprise a fixed gear as output gear on the output shaft and meshes not only with a first power take-off gear as constant pinion of the first countershaft, but also with a second power take-off gear as constant pinion of the second countershaft. Both power take-off gears can optionally also be designed as shiftable gears. A winding path gear-coupling device, for example, can be assigned for the shifting of the respective power take-off gear, which device releases the connection between the assigned countershaft and the output gear in the disengaged state to be able to shift winding path gears.

Advantageously, the lower forward gears and the reverse gears are activated by means of one start-up or shifting clutch to concentrate higher loads on this clutch and thereby to embody the second clutch with more effective use of space and more cost effectively. In particular, the gear planes of the proposed double clutch transmission can be arranged such that coupling can occur during start-up not only by means of the inner transmission input shaft but also the outer transmission input shaft and thereby by means of the clutch that is better suited at the time, which is possible in a concentrically arranged, radially nested construction of the double clutch. The gear planes can be correspondingly arranged as mirror images of each other or exchanged.

Independent of the particular variant embodiment, the proposed gear planes in the double clutch transmission, for example, can be interchanged.

BRIEF DESCRIPTION OF THE DRAWINGS

In the following, the present invention is explained more precisely by the use of the drawings. The figures show the following:

FIG. 2 a shift pattern of the first variant embodiment according to FIG. 1;

FIG. 4 a shift pattern of the second variant embodiment according to FIG. 3;

FIG. 6 a shift pattern of the third variant embodiment according to FIG. 5;

FIG. 8 a shift pattern of the fourth variant embodiment according to FIG. 7;

FIG. 10 a shift pattern of the fifth variant embodiment according to FIG. 9;

FIG. 12 a shift pattern of the sixth variant embodiment according to FIG. 11;

FIG. 14 a shift pattern of the seventh variant embodiment according to FIG. 13.

FIG. 16 a shift pattern of the eighth variant embodiment according to FIG. 15;

FIG. 18 a shift pattern of the ninth variant embodiment according to FIG. 17;

FIG. 20 a shift pattern of the tenth variant embodiment according to FIG. 19;

FIG. 22 a shift pattern of the eleventh variant embodiment according to FIG. 21;

FIG. 24 a shift pattern of the twelfth variant embodiment according to FIG. 23;

FIG. 26 a shift pattern of the thirteenth variant embodiment according to FIG. 25;

FIG. 28 a shift pattern of the fourteenth variant embodiment according to FIG. 27;

FIG. 30 a shift pattern of the fifteenth variant embodiment according to FIG. 29.

DETAILED DESCRIPTION OF THE EMBODIMENTS

Figure 1:
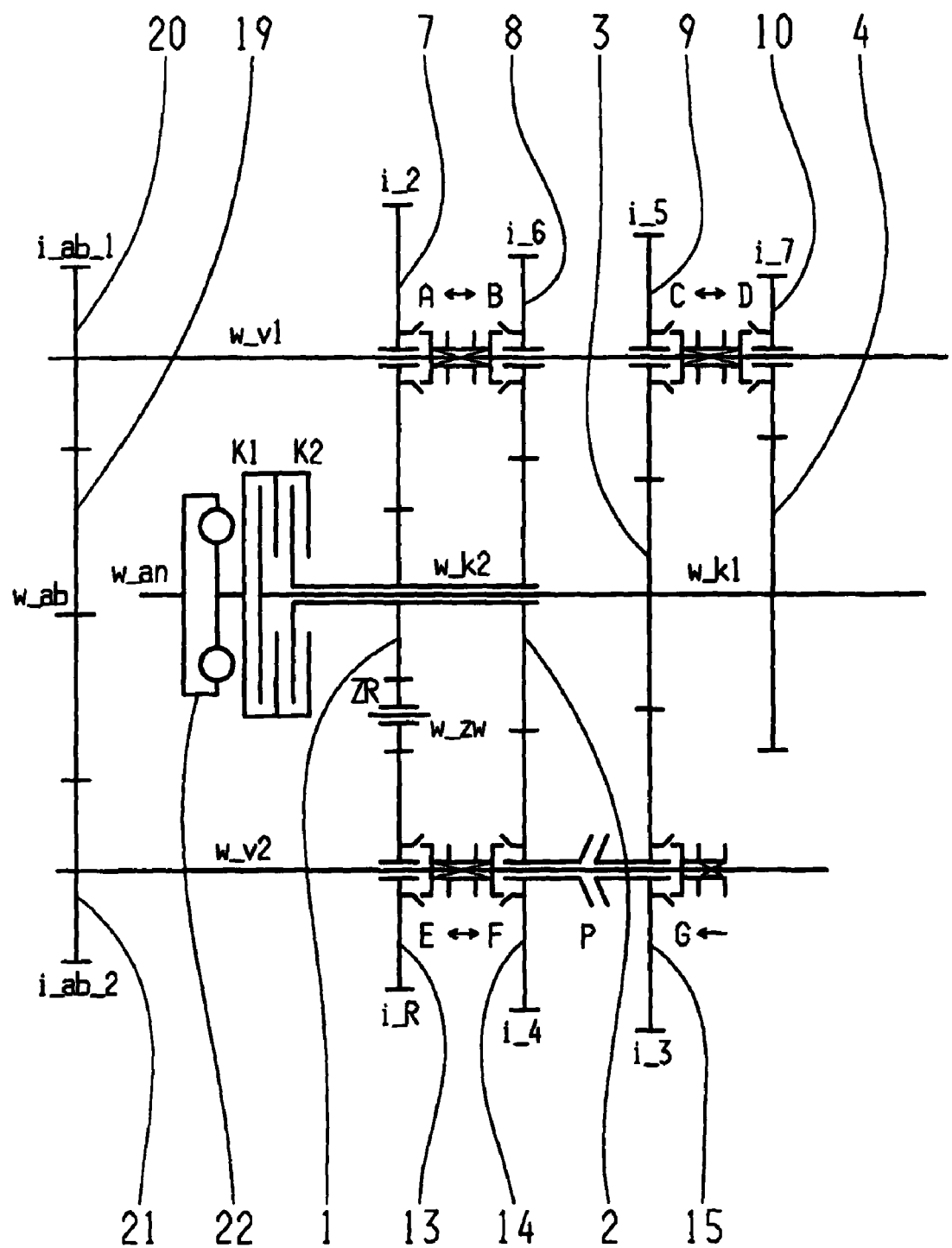
FIG. 1 a schematic view of a first variant embodiment of an eight-speed double clutch transmission according to the invention.

In each of the FIGS. 1, 3, 5, 7, 9, 11, 13, 15, 17, 19, 21, 23, 25, 27 and 29, a possible variant embodiment of an eight-speed-double clutch transmission is shown. The relevant shift patterns for the various variant embodiments are represented in tables in the FIGS. 2, 4, 6, 8, 10, 12, 14, 16, 18, 20, 22, 24, 26, 28 and 30.

The eight-speed double clutch transmission comprises two clutches K1, K2, of which the input sides are connected to a drive shaft w_an and of which the output sides are connected to one of two transmission input shafts w_k1, w_k2 which are arranged coaxially relative to each other. A torsion vibration damper 22 can additionally be arranged on the drive shaft w_an. Furthermore, two countershafts w_v1, w_v2 are provided on which toothed gearwheels designed as idler gears 7, 8, 9, 10, 11, 12, 13, 14, 15, 16, 17, 18 are fixed in a rotatable manner. Toothed gearwheels are arranged on the two transmission input shafts w_k1, w_k2 in a rotationally fixed manner and designed as fixed gears 1, 2, 3, 4, 5, 6, and mesh at least partly with the idler gears 7, 8, 9, 10, 11, 12, 13, 14, 15, 16, 17, 18.

To be able to connect idler gears 7, 8, 9, 10, 11, 12, 13, 14, 15, 16, 17, 18 to the relevant countershaft w_v1, w_v2, a plurality of activatable coupling devices A, B, C, D, E, F, G, H, I, J, K, L are provided on the countershafts w_v1, w_v2. Moreover, power take-off gears 20, 21 are arranged on the two countershafts w_v1, w_v2 as constant pinions and are each coupled with a gearing of a fixed gear 19 of one output shaft w_ab, wherein output stages i_ab_1, i_ab_2 corresponding to the power take-off gears 20, 21 are assigned.

Along with the coupling devices A, B, C, D, E, F, G, H, I, J, K, L, which in the activated state realize a connection in a rotationally fixed manner between a toothed gearwheel and the assigned countershaft w_v1, w_v2, a winding path gear-shift element N or P is provided on the second countershaft w_v2. The shift element N enables the idler gears 15 and 16 of the second countershaft w_v2 to be connected to each other, in order to couple the first subtransmission with the second subtransmission, so that winding path gears are shiftable. The shift element P enables the idler gears 14 and 15 of the second countershaft w_v2 to be connected to each other, in order to couple the first subtransmission with the second subtransmission, so that winding path gears are shiftable.

According to the invention, in the double clutch transmission only four or five gear planes 1-13, 7-1, 7-13, 8-2, 2-14, 8-14, 3-15, 9-15, 4-16, 10-4, 10-16, 5-17, 11-5, 11-17, 12-6, 6-18, 12-18 are provided, wherein at least three dual gear planes 7-13, 8-14, 9-15, 10-16, 11-17, 12-18 are provided in each variant embodiment, such that winding path gears are shiftable at least when shift element N or P is activated and if needed also by means of another activated shift element M or O as well as by means of at least one of the winding path gears-coupling devices S_ab1, S_ab2. A claw or the like, for example, can be used as shift elements N, P, M and O for the connection of two gears or the like.

When coupling device S_ab1 or S_ab2 is disengaged, the connection in a rotationally fixed manner can be released between the power take-off gear 20 or 21 and the first countershaft w_v1 or the second countershaft w_v2. In addition, if needed the winding path gear-shift element M can be provided for the connection in a rotationally fixed manner of idler gears 9 and 10 of the first countershaft w_v1, so that at least one winding path gear can optionally be realized also by means of the activated shift element M. Moreover, the additional winding path gear-shift element O can also be provided as needed for the connection in a rotationally fixed manner of the idler gears 8 and 9 of the first countershaft w_V1, so that at least one other winding path gear can be realized also by means of the activated shift element O.

In the first variant embodiment according to FIGS. 1 and 2, fixed gear 1 of the second transmission input shaft w_k2 in the first gear plane 7-13 as dual gear plane meshes with idler gear 7 of the first countershaft w_v1, and with an intermediate gear ZR on an intermediate shaft w_zw for the rotation reversal for the reverse gear transmission ratios, wherein intermediate gear ZR also meshes with idler gear 13 of the second countershaft w_v2. In the second gear plane 8-14 as dual gear plane, fixed gear 2 of the second transmission input shaft w_k2 meshes with idler gear 8 of the first countershaft w_v1 and with idler gear 14 of the second countershaft w_v2. In the third gear plane 9-15 as dual gear plane, fixed gear 3 of the first transmission input shaft w_k1 engages with idler gear 9 of the first countershaft w_v1 and with idler gear 15 of the second countershaft w_v2. Finally, in the fourth gear plane 10-4 as single gear plane, fixed gear 4 of the first transmission input shaft w_k1 meshes with idler gear 10 of the first countershaft w_v1.

Figure 3:
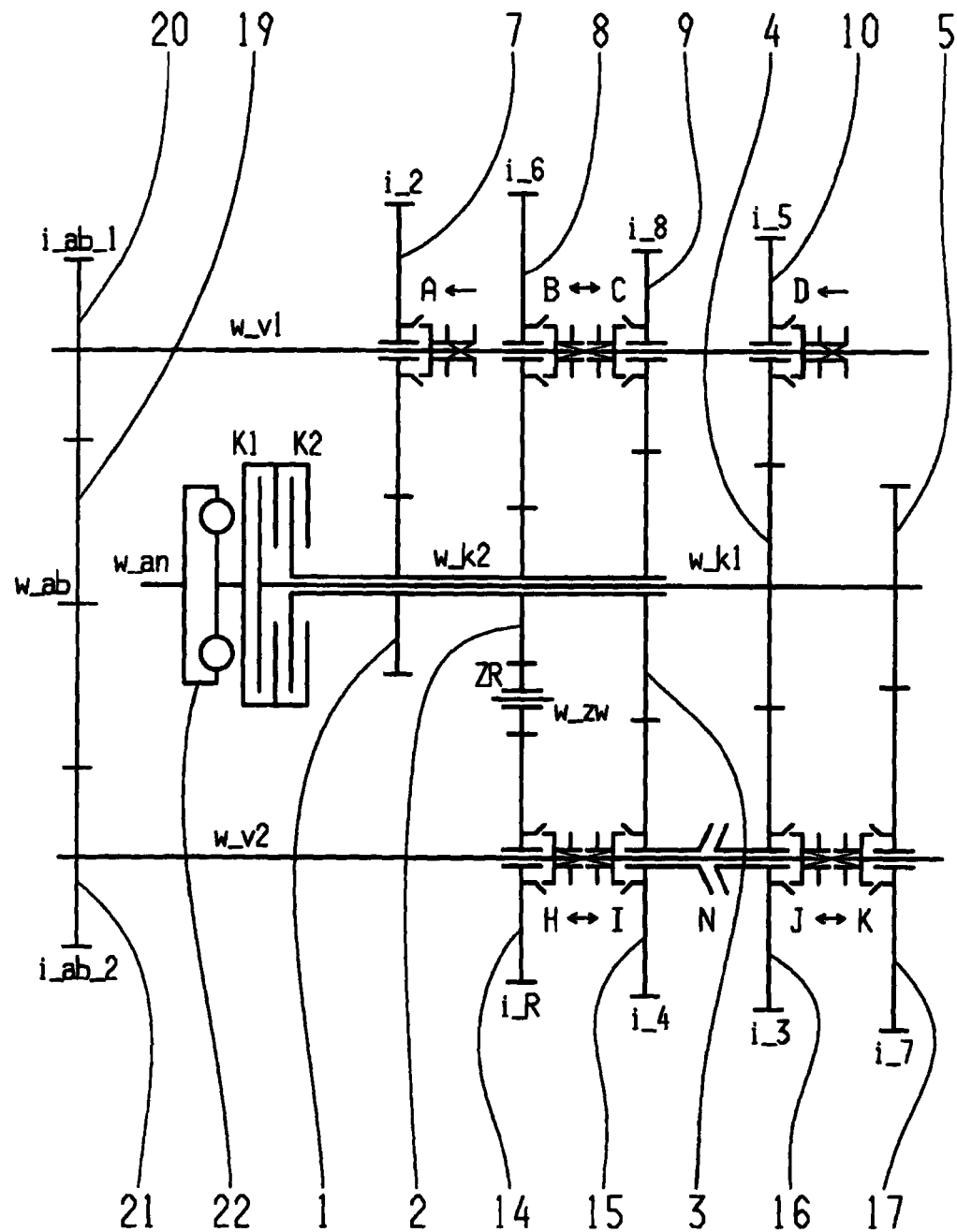
FIG. 3 a schematic view of a second variant embodiment of the eight-speed-double clutch transmission according to the invention.
Figure 11:
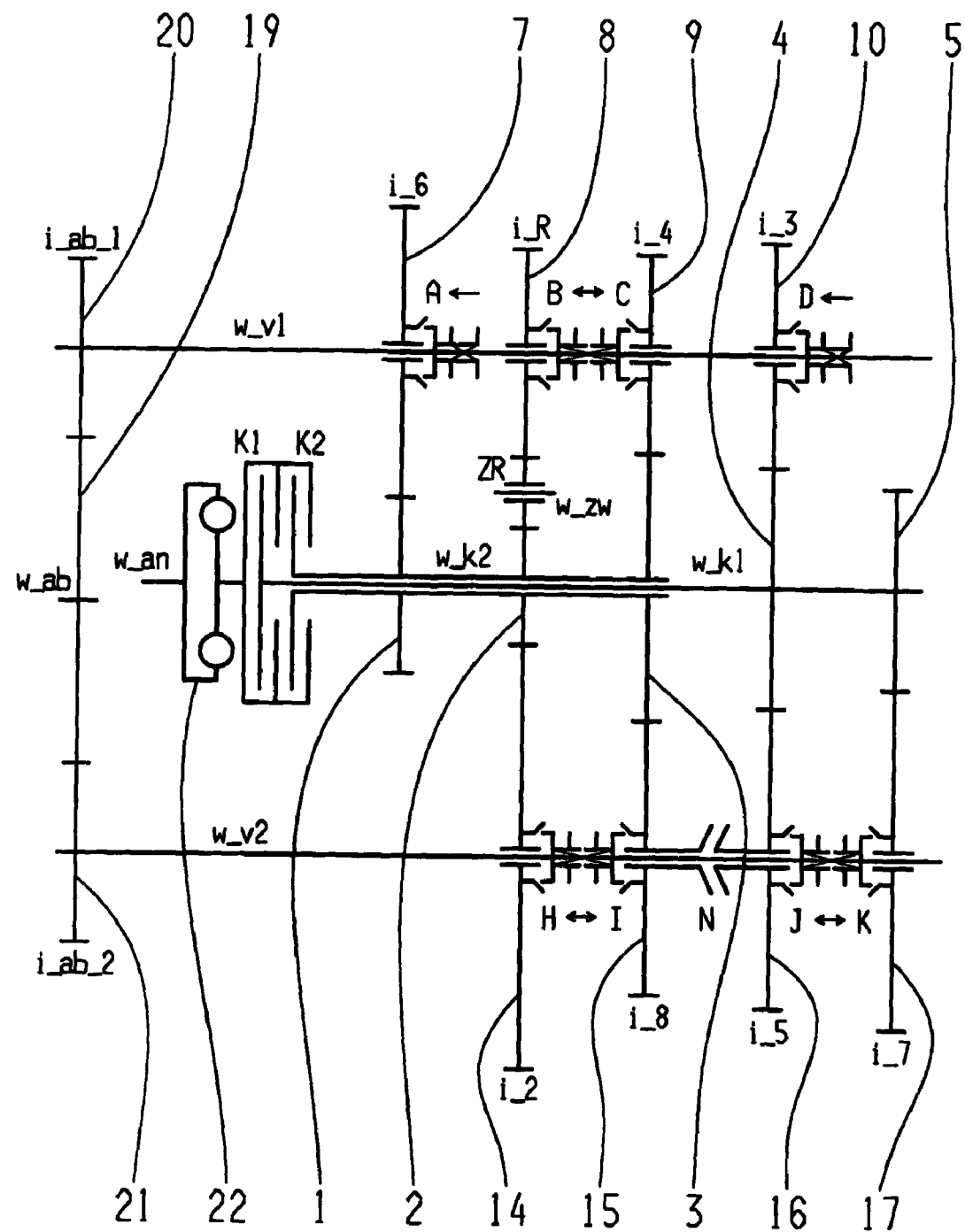
FIG. 11 a schematic view of a sixth variant embodiment of the eight-gear-double clutch transmission according to the invention.

In the second and sixth variant embodiments according to FIGS. 3 and 11, fixed gear 1 of the second transmission input shaft w_k2 in the first gear plane 7-1 as single gear plane meshes with idler gear 7 of the first countershaft w_v1. In the second gear plane 8-14 as dual gear plane in the second variant embodiment, fixed gear 2 of the second transmission input shaft w_k2 meshes with idler gear 8 of the first countershaft w_v1 and with intermediate gear ZR for the rotation reversal for the reverse gear transmission ratios, wherein intermediate gear ZR engages also with idler gear 14 of the second countershaft w_v2. In contrast thereto, fixed gear 2 in the sixth variant embodiment meshes with idler gear 14 of the second countershaft w_v2 and with intermediate gear ZR, wherein intermediate gear ZR engages with the idler gear of the first countershaft w_v1. In the second as well as in the sixth variant embodiment, in the third gear plane 9-15 as dual gear plane, fixed gear 3 of the second transmission input shaft w_k2 meshes with idler gear 9 of the first countershaft w_v1 and also with idler gear 15 of the second countershaft w_v2. In the fourth gear plane 10-16 as dual gear plane, fixed gear 4 of the first transmission input shaft w_k1 engages with idler gear 10 of the first countershaft w_v1 and with idler gear 16 of the second countershaft w_V2. Finally, in the fifth gear plane 5-17 as single gear plane, fixed gear 5 of the first transmission input shaft w_k1 meshes with idler gear 17 of the second countershaft w_v2.

Figure 5:
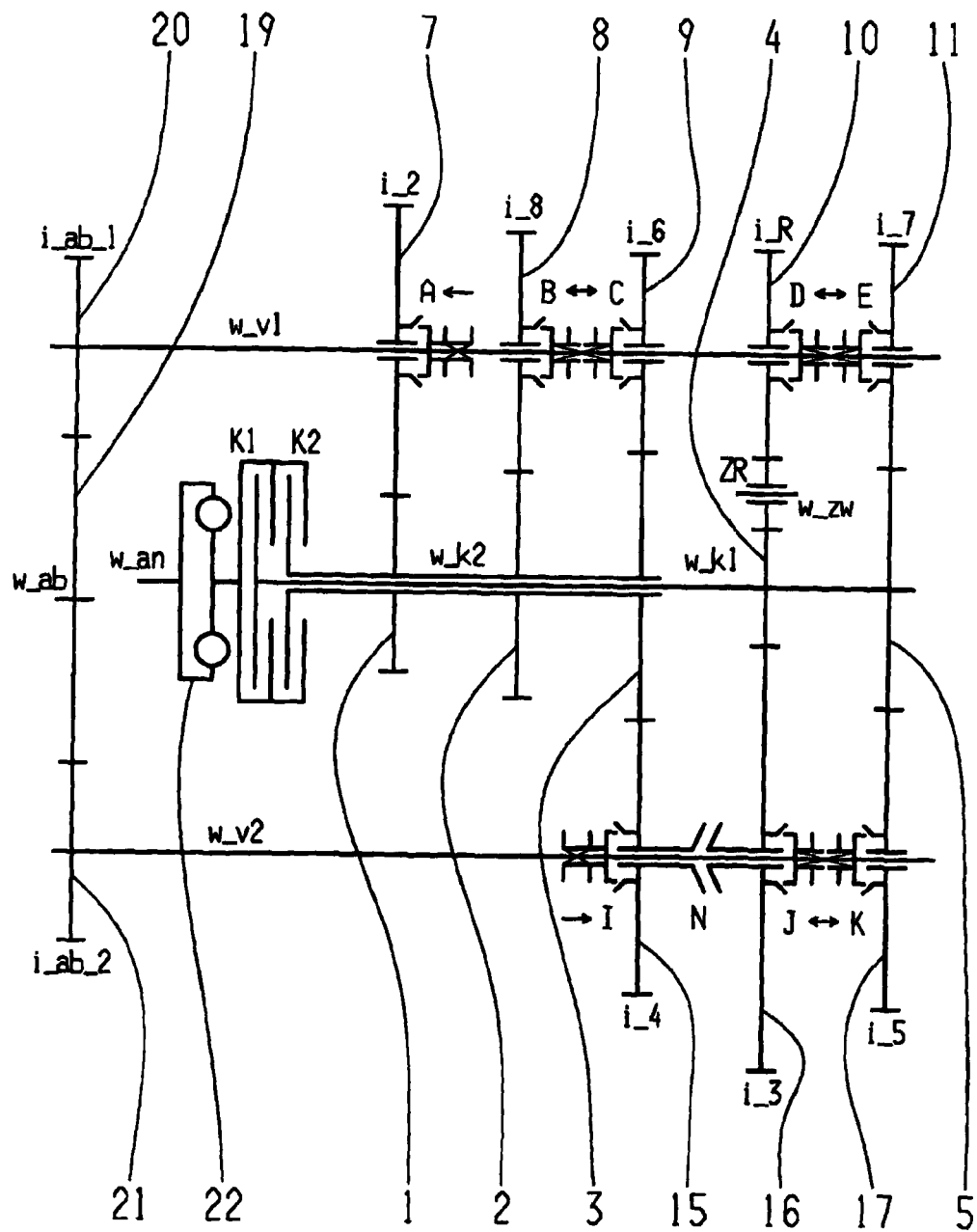
FIG. 5 a schematic view of a third variant embodiment of the eight-speed-double clutch transmission according to the invention.

In the third variant embodiment according to FIGS. 5 and 6, fixed gear 1 of the second transmission input shaft w_k2 in the first gear plane 7-1 as single gear plane meshes with idler gear 7 of the first countershaft w_v1. In the second gear plane 8-2 as single gear plane, fixed gear 2 of the second transmission input shaft w_k2 meshes with idler gear 8 of the first countershaft w_v1. In the third gear plane 9-15 as dual gear plane, fixed gear 3 of the second transmission shaft w_k2 engages with idler gear 9 of the first countershaft w_v1 and also with idler gear 15 of the second countershaft w_v2. In fourth gear plane 10-16 as dual gear plane, fixed gear 4 of the first transmission input shaft w_k1 engages with idler gear 16 of the second countershaft w_v2 and with intermediate gear ZR for the rotation reversal for the reverse gear transmission ratios, wherein intermediate gear ZR engages also with idler gear 10 of the first countershaft w_v1. Finally, fixed gear 5 of the first transmission input shaft w_k1 in the fifth gear plane 11-17 as dual gear plane meshes with idler gear 11 of the first countershaft w_v1 and with idler gear 17 of the second countershaft w_v2.

Figure 7:
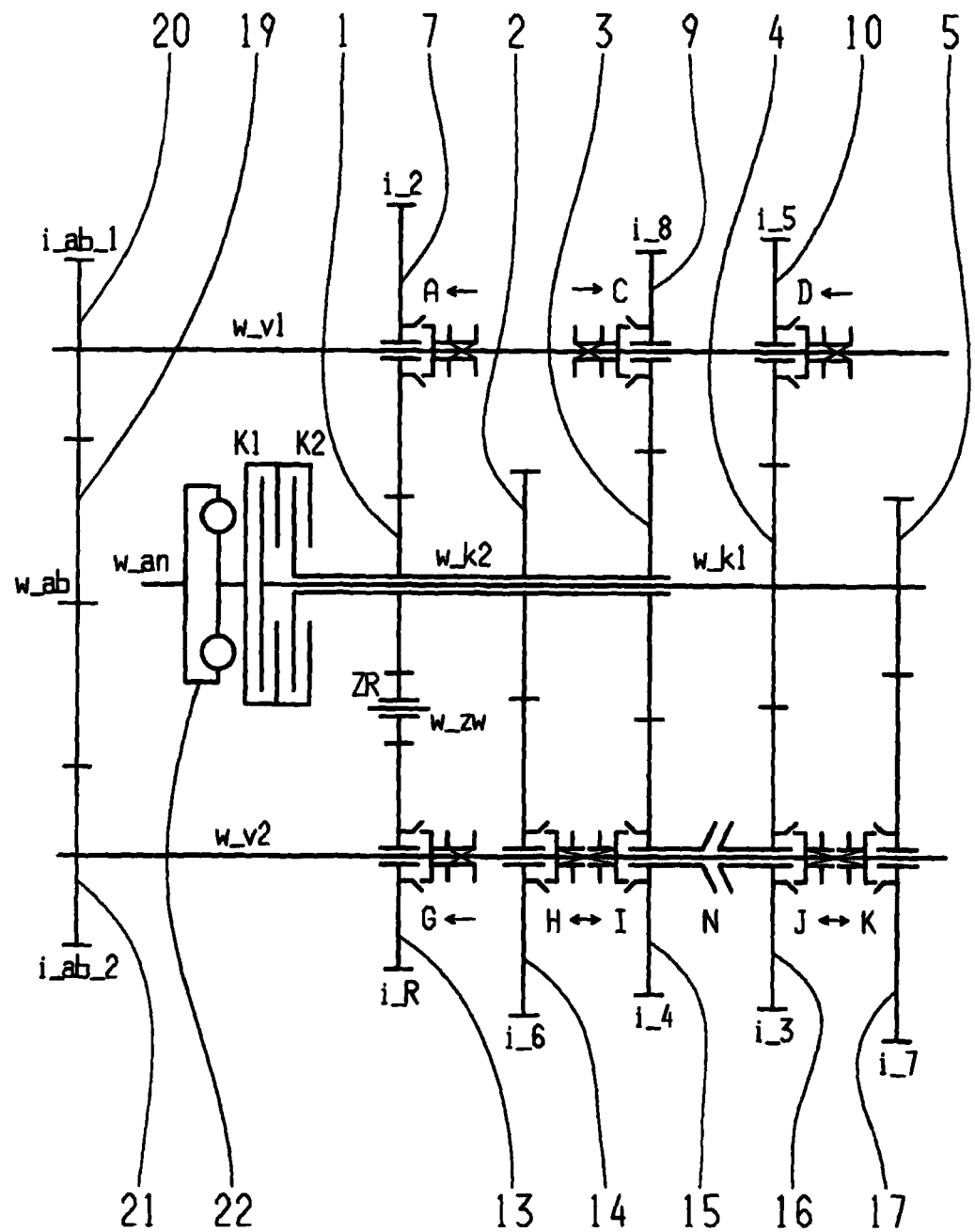
FIG. 7 a schematic view of a fourth variant embodiment of the eight-speed-double clutch transmission according to the invention.

In the fourth variant embodiment according to FIGS. 7 and 8, fixed gear 1 of the second transmission input shaft w_k2 in the first gear plane 7-13 as dual gear plane engages with idler gear 7 of the first countershaft w_v1 and also with intermediate gear ZR for the rotation reversal for the reverse gear transmission ratios, wherein intermediate gear ZR meshes also with idler gear 13 of the second countershaft w_v2. In the second gear plane 2-14 as single gear plane, fixed gear 2 of the second transmission input shaft w_k2 meshes with idler gear 14 of the second countershaft w_v2. In the third gear plane 9-15 as dual gear plane, fixed gear 3 of the second transmission input shaft w_k2 engages with idler gear 9 of the first countershaft w_v1 and with idler gear 15 of the second countershaft w_v2. In the fourth gear plane 10-16 as dual gear plane, fixed gear 4 of the first transmission input shaft w_k1 meshes with idler gear 10 of the first countershaft w_v1 and also with idler gear 16 of the second countershaft w_v2. Finally, fixed gear 5 of the first transmission input shaft w_k1 in the fifth gear plane 5-17 as single gear plane meshes with idler gear 17 of the second countershaft w_v2.

Figure 9:
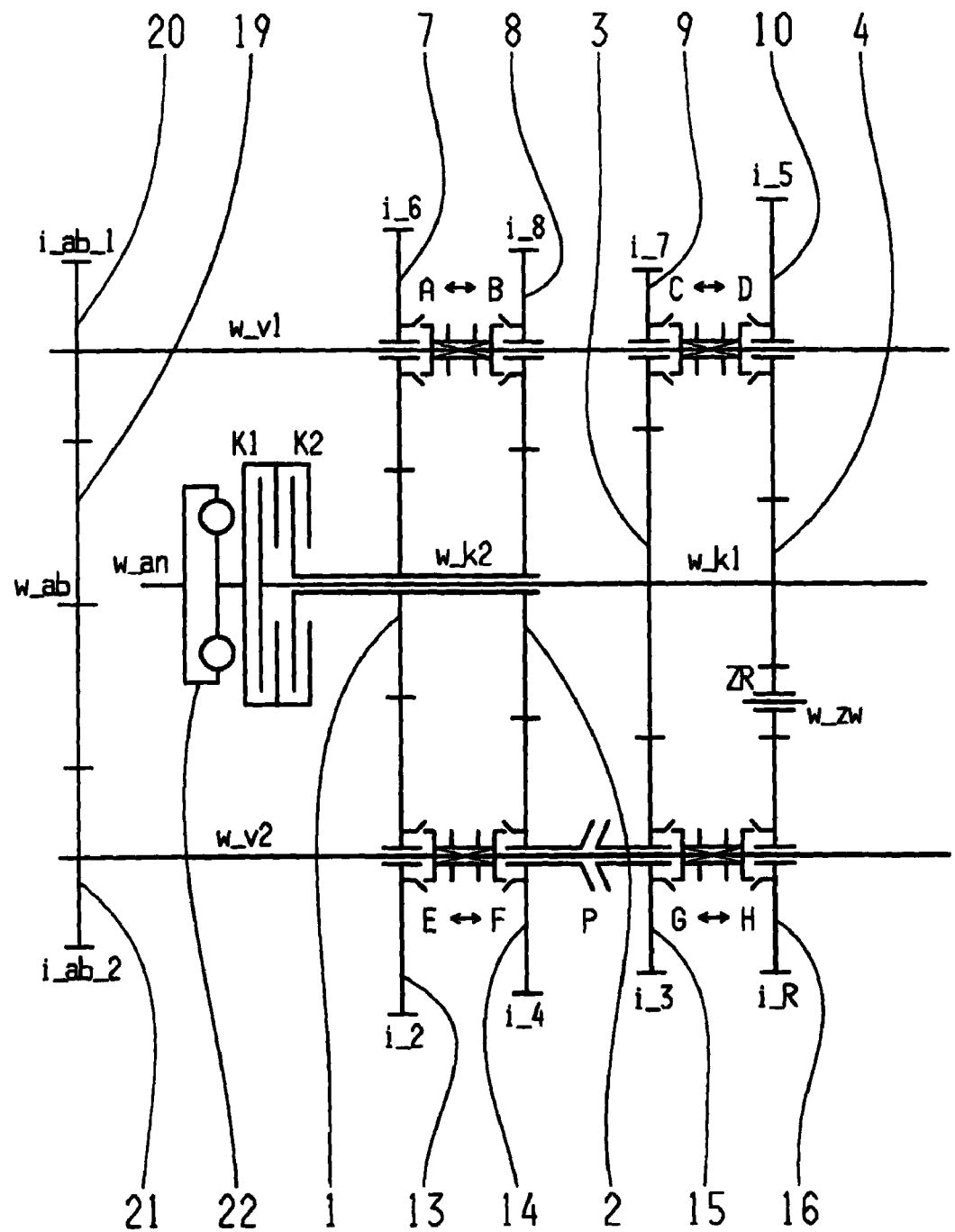
FIG. 9 a schematic view of a fifth variant embodiment of the eight-speed double clutch transmission according to the invention.

In the fifth variant embodiment according to the FIGS. 9 and 10, fixed gear 1 of the second transmission input shaft w_k2 in the first gear plane 7-13 as dual gear plane engages with idler gear 7 of the first countershaft w_v1 and also with idler gear 13 of the second countershaft w_v2. In the second gear plane 8-14 as dual gear plane, fixed gear 2 of the second transmission input shaft w_k2 meshes with idler gear 8 of the first countershaft w_v1 and also with idler gear 14 of the second countershaft w_v2. In the third gear plane 9-15 as dual gear plane, fixed gear 3 of the first transmission input shaft w_k1 engages with idler gear 9 of the first countershaft w_v1 and with idler gear 15 of the second countershaft w_v2. Finally, in the fourth gear plane 10-16 as dual gear plane, fixed gear 4 of the first transmission input shaft w_k1 meshes with idler gear 10 of the first countershaft w_v1 and also with intermediate gear ZR for the rotation reversal for the reverse gear transmission ratios, wherein intermediate gear ZR also engages with idler gear 16 of the second countershaft w_v2.

Figure 13:
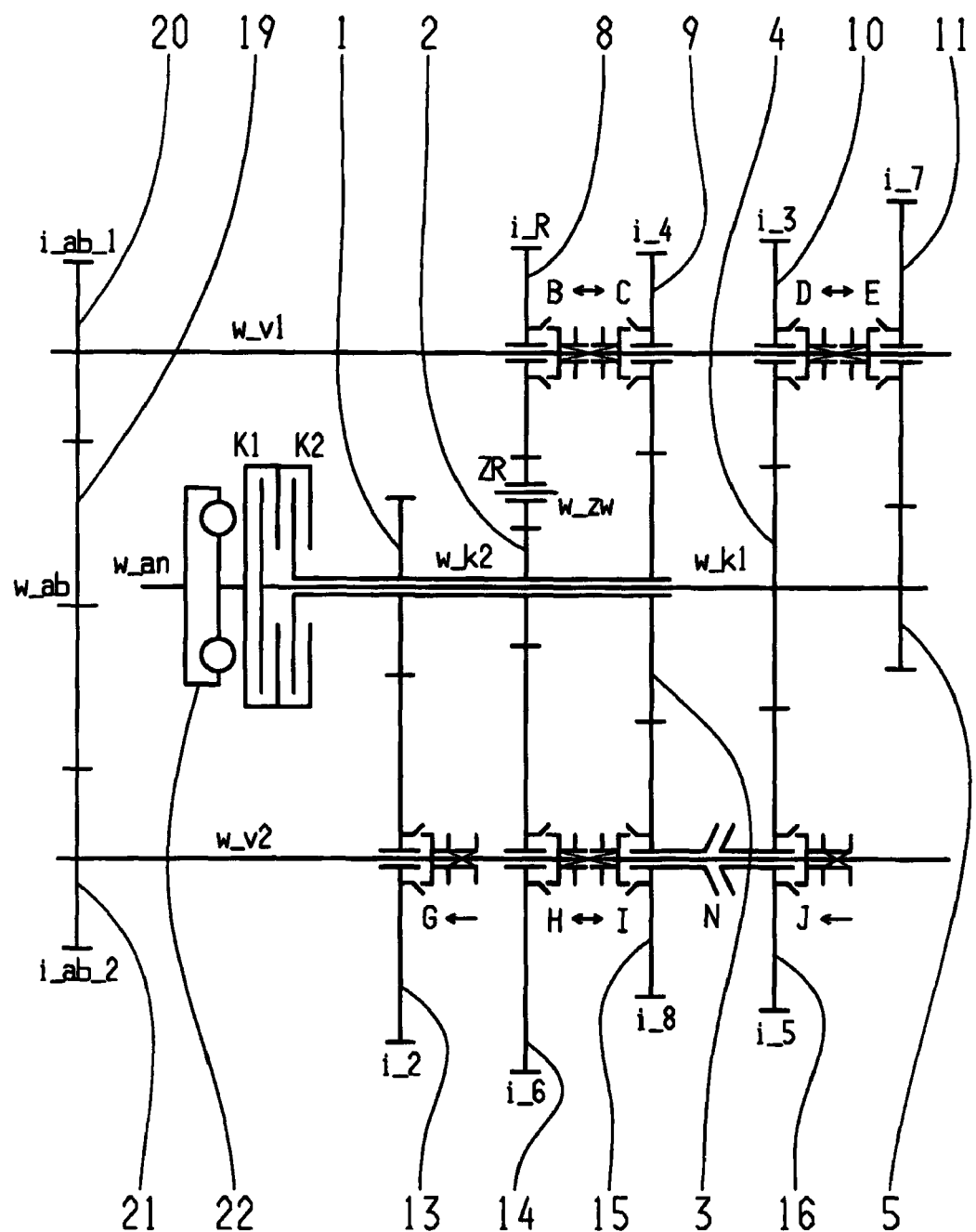
FIG. 13 a schematic view of a seventh variant embodiment of the eight-speed-double-clutch transmission according to the invention.

In the seventh variant embodiment according to FIGS. 13 and 14, fixed gear 1 of the second transmission input shaft w_k2 in the first gear plane 1-13 as single gear plane engages with idler gear 13 of the second countershaft w_v2. In the second gear plane 8-14 as dual gear plane, fixed gear 2 of the second transmission input shaft w_k2 engages with idler gear 14 of the second countershaft w_v2 as well as with intermediate gear ZR for rotational reversal for the reverse gear transmission ratios, wherein intermediate gear ZR engages also with idler gear 8 of the first countershaft w_v1. In the third gear plane 9-15 as dual gear plane, fixed gear 3 of the second transmission input shaft w_k2 meshes with idler gear 9 of the first countershaft w_v1 as well as with idler gear 15 of the second countershaft w_v2. In the fourth gear plane 10-16 as dual gear plane, fixed gear 4 of the first transmission input shaft w_k1 engages with idler gear 10 of the first countershaft w_v1 as well as with idler gear 16 of the second countershaft w_v2. Finally, in the fifth gear plane 11-5 as single gear plane, fixed gear 5 of the first transmission input shaft w_k1 meshes with idler gear 11 of the first countershaft w_v1.

Figure 15:
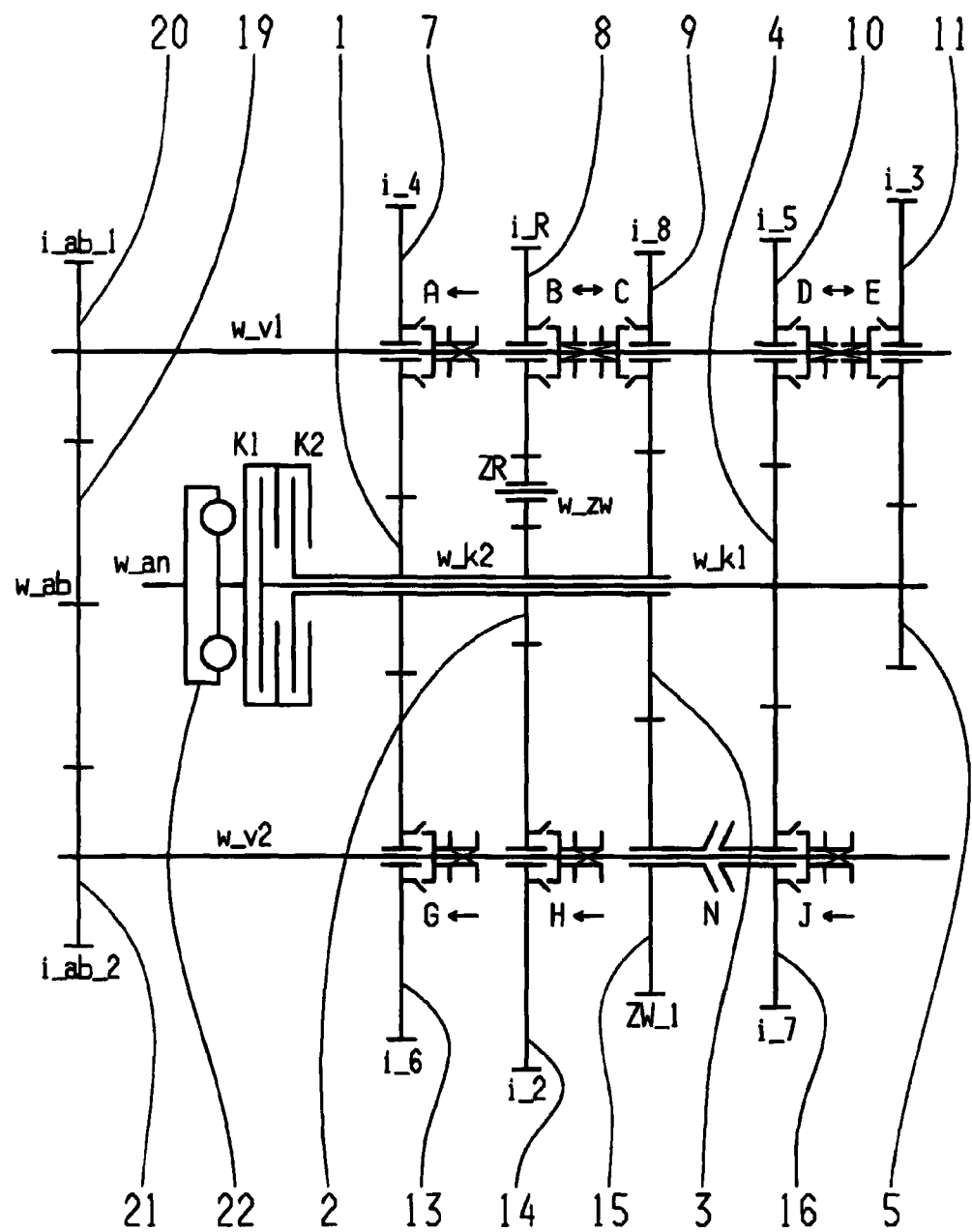
FIG. 15 a schematic view of an eighth variant embodiment of the eight-speed-double-clutch transmission according to the invention.

In the eighth variant embodiment according to FIGS. 15 and 16, fixed gear 1 of the second transmission input shaft w_k2 in the first gear plane 7-13 as dual gear plane engages with idler gear 7 of the first countershaft w_v1 as well as with idler gear 13 of the second countershaft w_v2. In the second gear plane 8-14 as dual gear plane, fixed gear 2 of the second transmission input shaft w_k2 meshes with idler gear 14 of the second countershaft w_v2 as well as with intermediate gear ZR for rotational reversal for the reverse gear transmission ratios, wherein the intermediate gear ZR also engages with idler gear 8 of the first countershaft w_v1. In the third gear plane 9-15 as dual gear plane, fixed gear 3 engages with idler gear 9 of the first countershaft w_v1 as well as with idler gear 15 of the second countershaft w_v2. In the fourth gear plane 10-16 as dual gear plane, fixed gear 4 of the first transmission input shaft w_k1 meshes with idler gear 10 of the first countershaft w_v1 as well as with idler gear 16 of the second countershaft w_v2. Finally, in the fifth gear plane 11-5 as single gear plane, fixed gear 5 of the first transmission input shaft w_k1 engages with idler gear 11 of the first countershaft w_v1.

Figure 17:
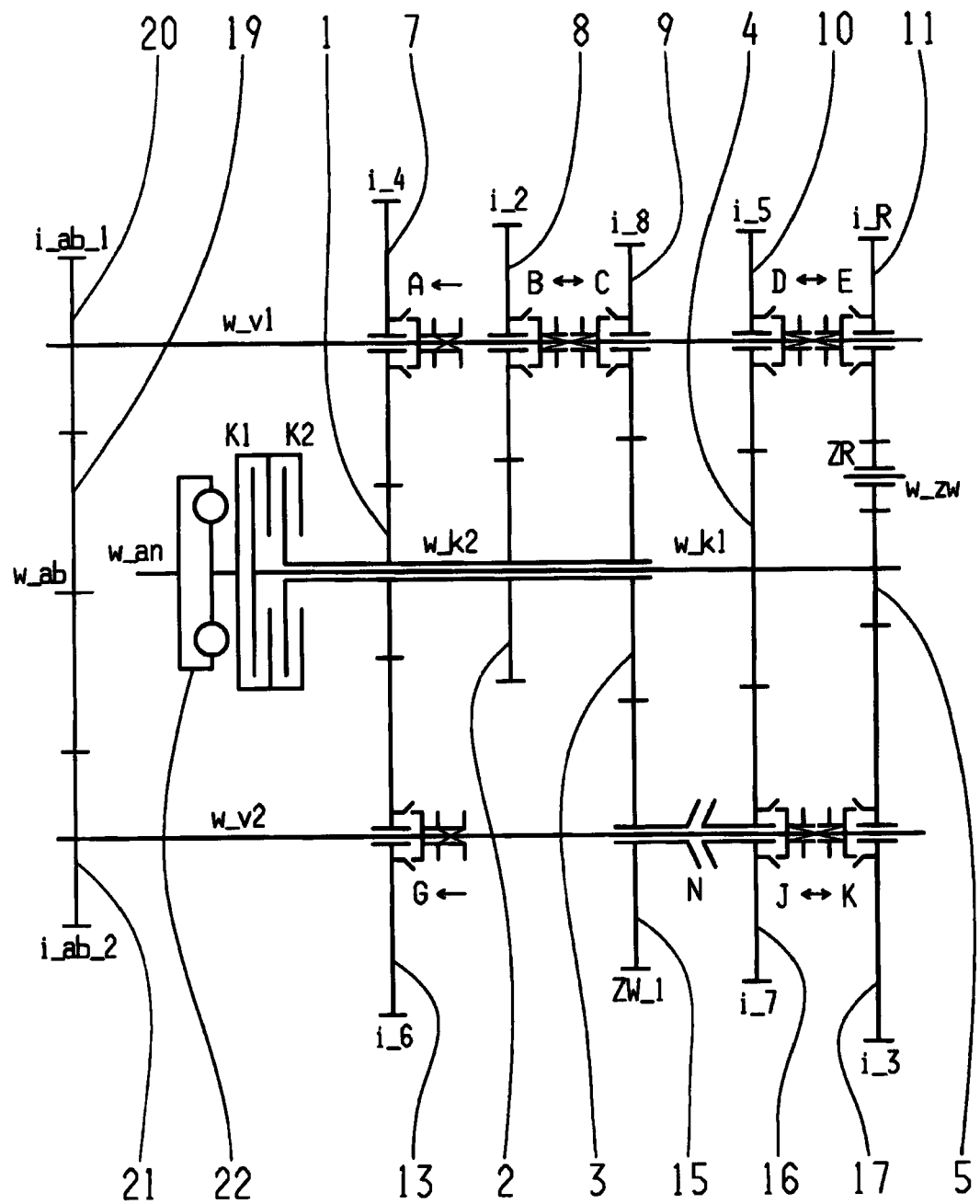
FIG. 17 a schematic view of a ninth variant embodiment of the eight-speed-double-clutch transmission according to the invention.

In the ninth variant embodiment according to FIGS. 17 and 18, fixed gear 1 of the second transmission input shaft w_k2 meshes in the first gear plane 7-13 as dual gear plane with idler gear 7 of the first countershaft w_v1 as well as with idler gear 13 of the second countershaft w_v2. In the second gear plane 8-2 as single gear plane, fixed gear 2 of the second transmission input shaft w_k2 meshes with idler gear 8 of the first countershaft w_v1. In the third gear plane 9-15 as dual gear plane, the fixed gear 3 of the second transmission input shaft w_k2 engages with idler gear 9 of the first countershaft w_v1 as well as with idler gear 15 of the second countershaft w_v2. In the fourth gear plane 10-16 as dual gear plane, fixed gear 4 of the first transmission input shaft w_k1 meshes with idler gear 10 of the first countershaft w_v1 as well as with idler gear 16 of the second countershaft w_v2. Finally, in the fifth gear plane 11-17 as dual gear plane, fixed gear 5 of the first transmission input shaft w_k1 engages with idler gear 17 of the second countershaft w_v2 as well as with intermediate gear ZR for rotational reversal for the reverse gear transmission ratios, wherein intermediate gear ZR meshes also with idler gear 11 of the first countershaft w_v1.

Figure 19:
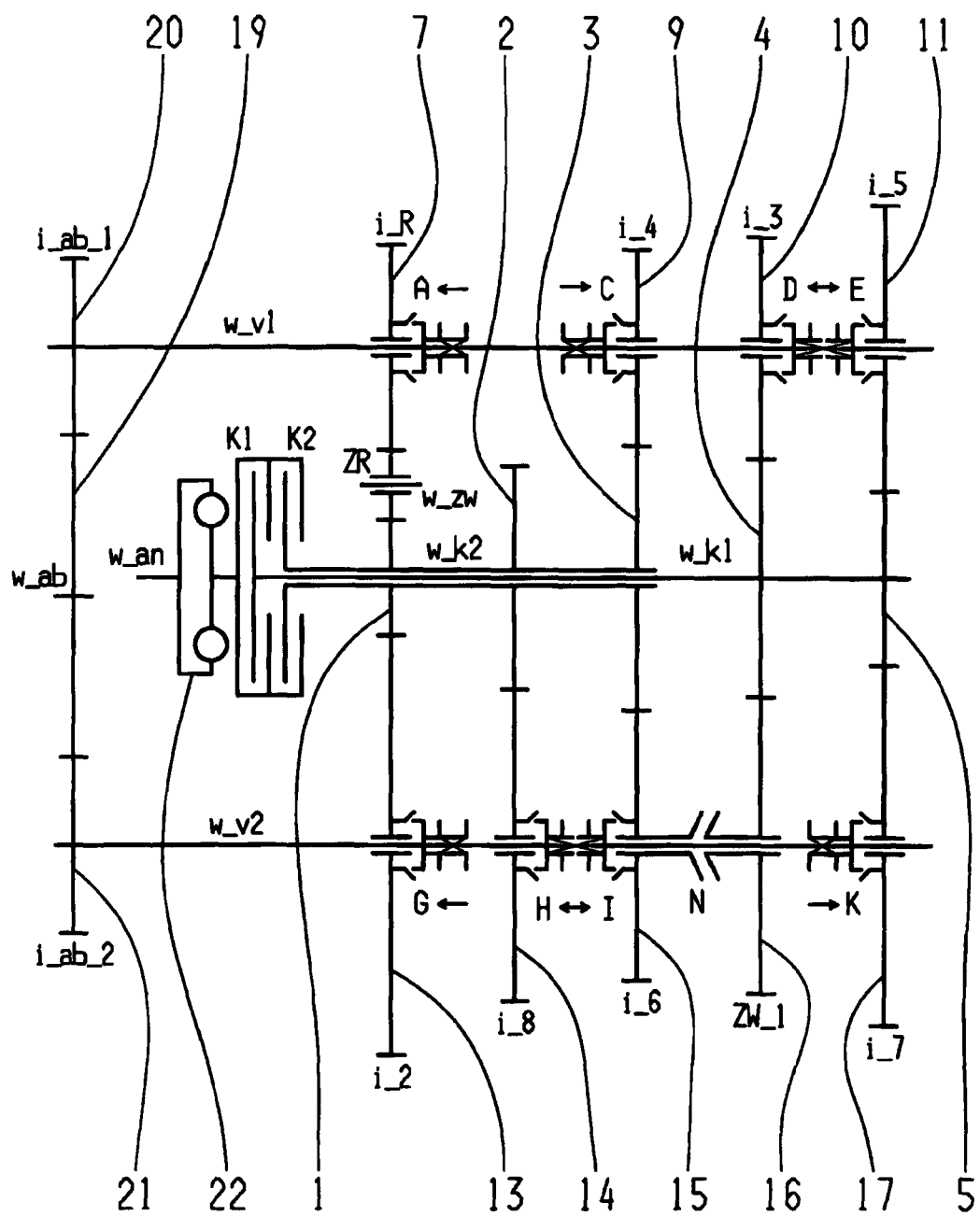
FIG. 19 a schematic view of a tenth variant embodiment of an eight-speed-double-clutch transmission according to the invention.

In the tenth variant embodiment according to FIGS. 19 and 20, fixed gear 1 of the second transmission input shaft w_k2 meshes in the first gear plane 7-13 as dual gear plane with idler gear 13 of the second countershaft w_v2 as well as with intermediate gear ZR for the rotational reversal for the reverse gear transmission ratios, wherein the intermediate gear ZR engages also with idler gear 7 of the first countershaft w_v1. In the second gear plane 2-14 as single gear plane, the fixed gear 2 of the second transmission input shaft w_k2 meshes with idler gear 14 of the second countershaft w_v2. In the third gear plane 9-15 as dual gear plane, fixed gear 3 of the second transmission input shaft w_k2 meshes with idler gear 9 of the first countershaft w_v1 as well as with idler gear 15 of the second countershaft w_v2. In the fourth gear plane 10-16 as dual gear plane, fixed gear 4 of the first transmission input shaft w_k1 engages with idler gear 10 of the first countershaft w_v1 as well as with idler gear 16 of the second countershaft w_v2. Finally, in the fifth gear plane 11-17 as dual gear plane, fixed gear 5 of the first transmission input shaft w_k1 meshes with idler gear 11 of the first countershaft w_v1 as well as with idler gear 17 of the second countershaft w_v2.

Figure 21:
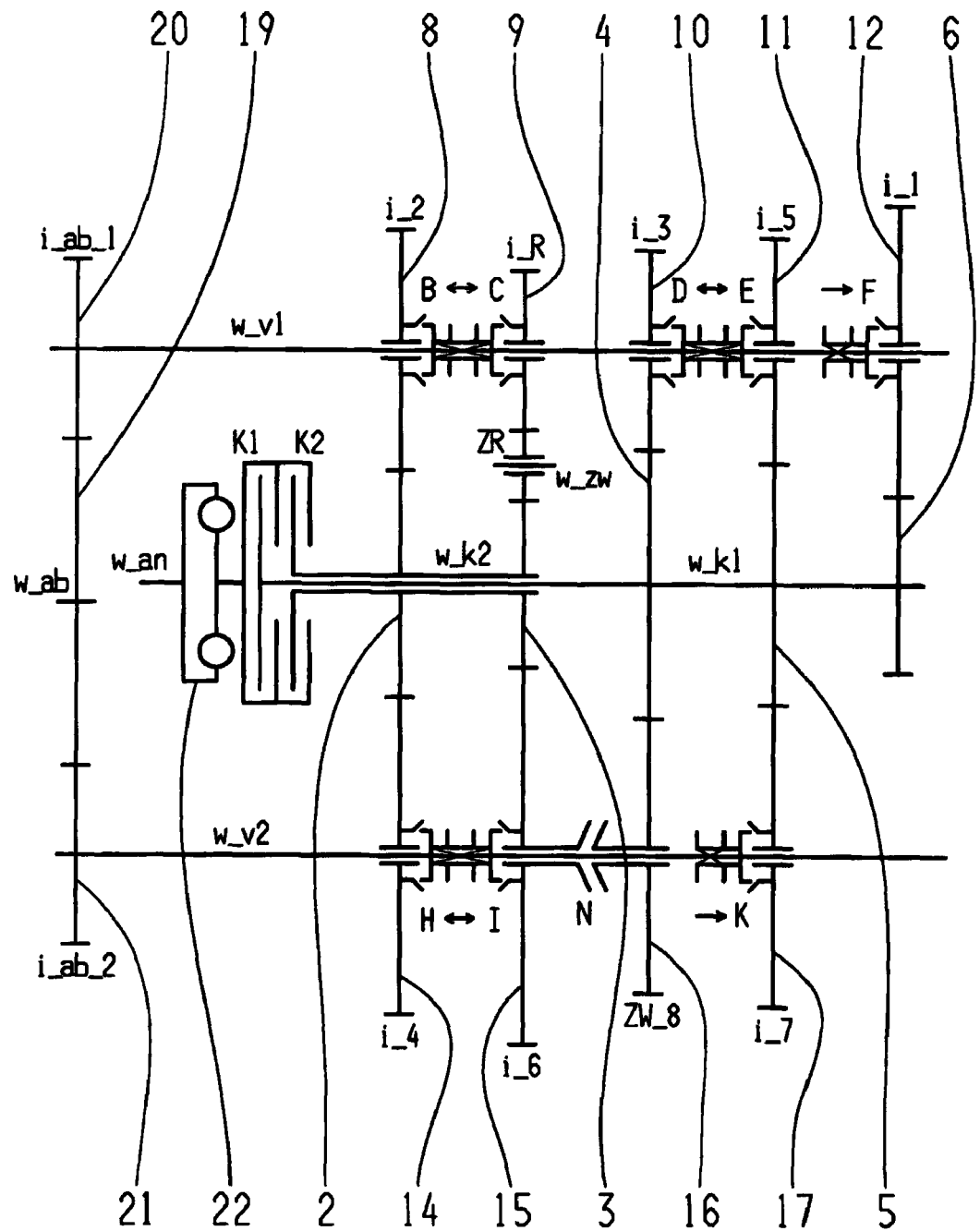
FIG. 21 a schematic view of an eleventh variant embodiment of the eight-speed double clutch transmission according to the invention.
Figure 29:
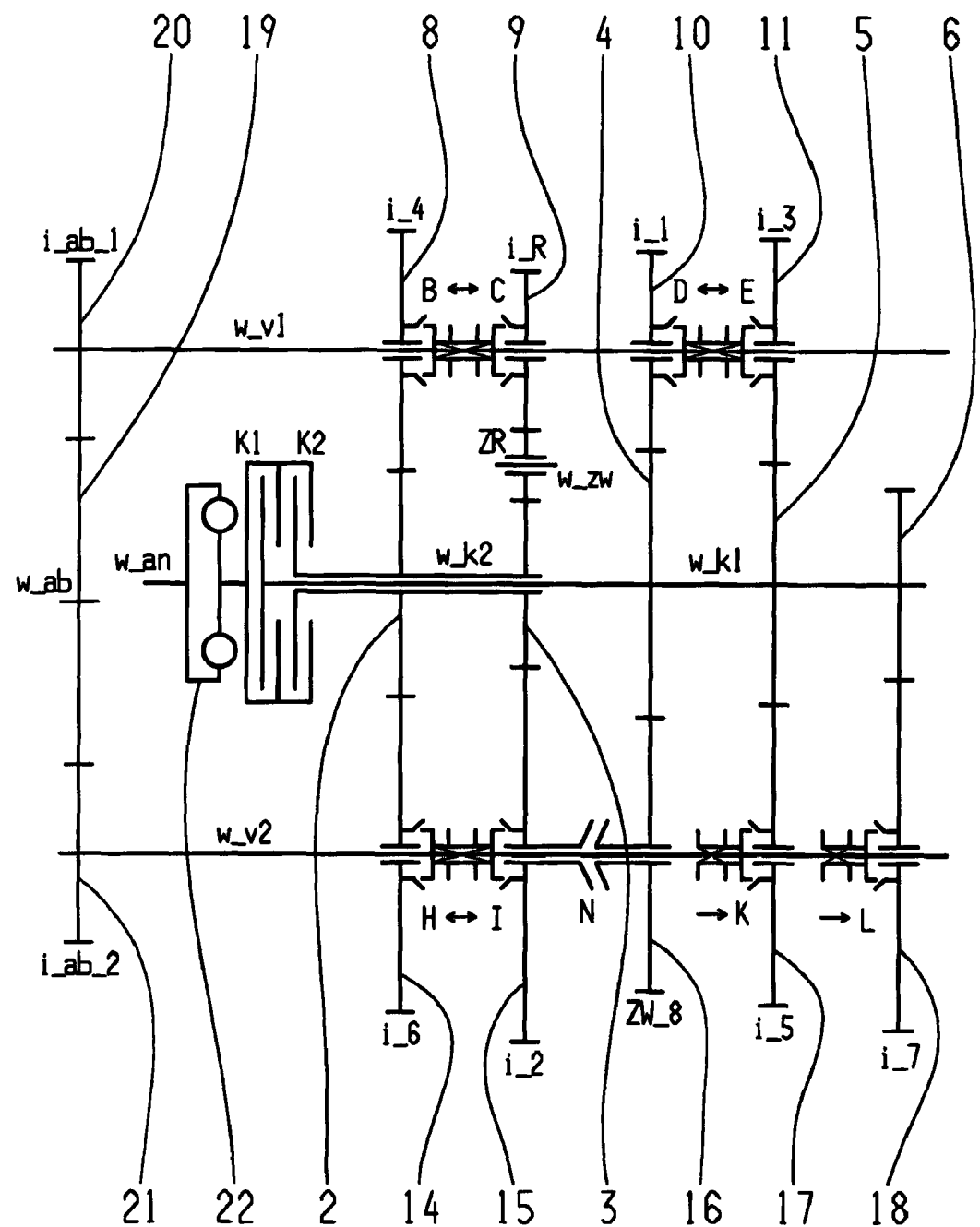
FIG. 29 a schematic view of a fifteenth variant embodiment of the eight-speed-double clutch transmission according to the invention.

In the eleventh and the fifteenth variant embodiment according to FIGS. 21 and 29, the fixed gear 2 of the second transmission input shaft w_k2 meshes in the first gear plane 8-14 as dual gear plane with idler gear 8 of the first countershaft w_v1 as well as with idler gear 14 of the second countershaft w_v2. In the second gear plane 9-15 as dual gear plane, fixed gear 3 of the second transmission input shaft w_k2 engages with idler gear 15 of the second countershaft w_v2 as well as with intermediate gear ZR for rotation reversal for the reverse gear transmission ratios, wherein intermediate gear ZR engages also with idler gear 9 of the first countershaft w_v1. In the third gear plane 10-16 as dual gear plane, fixed gear 4 of the first transmission input shaft w_k1 meshes with idler gear 10 of the first countershaft w_v1 as well as with idler gear 16 of the second countershaft w_v2. In the fourth gear plane 11-17 as dual gear plane, fixed gear 5 of the first transmission input shaft w_k1 meshes with idler gear 11 of the first countershaft w_v1 as well as with idler gear 17 of the second countershaft w_v2. In the eleventh variant embodiment, the fixed gear 6 of the first transmission input shaft w_k1 meshes in the fifth gear plane 12-6 as single gear plane with idler gear 12 of the first countershaft w_v1. In the fifteenth variant embodiment, fixed gear 6 of the first transmission input shaft w_k1 meshes in the fifth gear plane 6-18 as single gear plane with idler gear 18 of the second countershaft w_v2.

Figure 23:
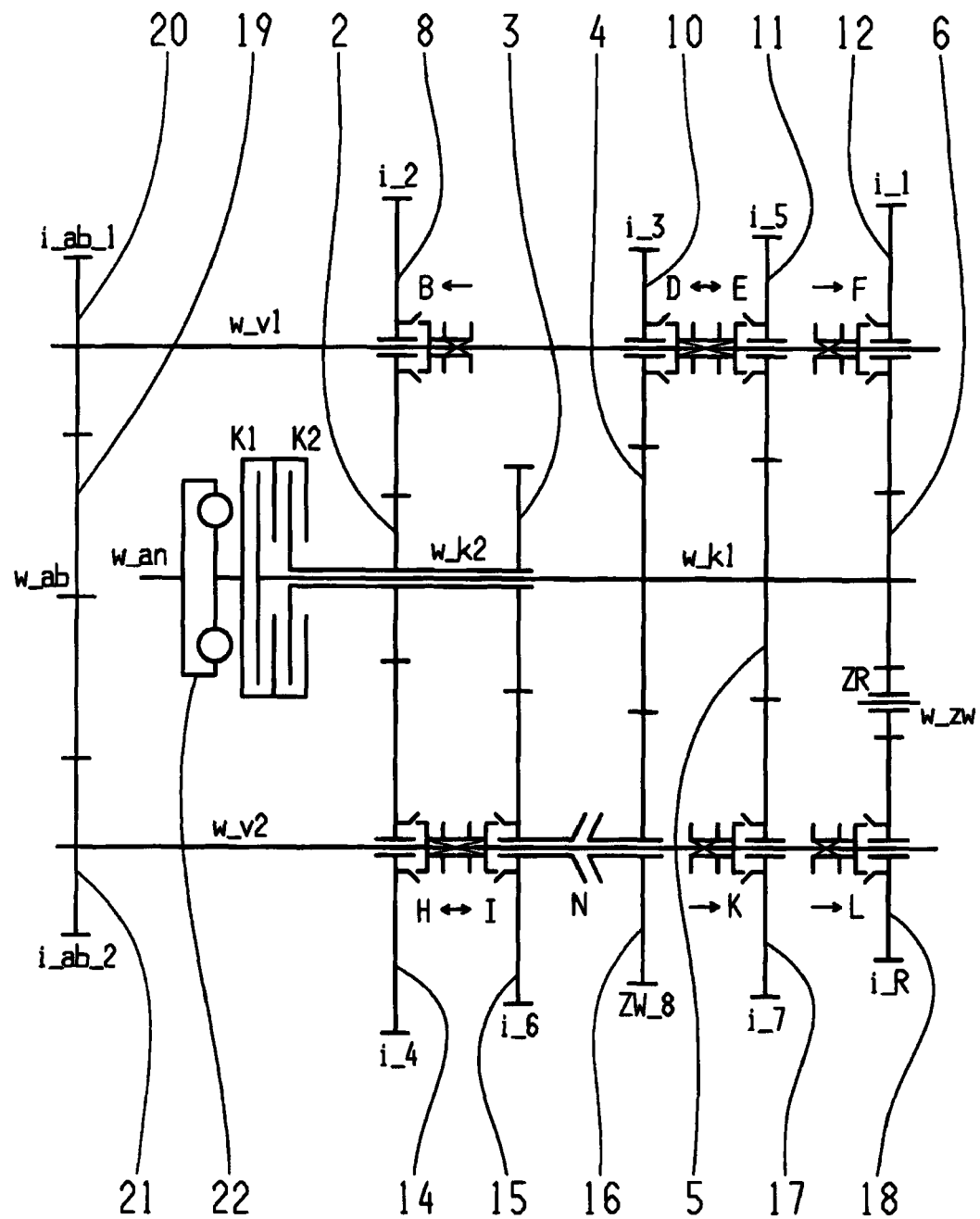
FIG. 23 a schematic view of a twelfth variant embodiment of the eight-speed-double-clutch transmission according to the invention.

In the twelfth variant embodiment according to FIGS. 23 and 24, fixed gear 2 of the second transmission input shaft w_k2 engages in the first gear plane 8-14 as dual gear plane with idler gear 8 of the first countershaft w_v1 as well as with idler gear 14 of the second countershaft w_v2. In the second gear plane 3-15 as single gear plane, fixed gear 3 of the second transmission input shaft w_k2, meshes with idler gear 15 of the second countershaft w_v2. In the third gear plane 10-16 as dual gear plane, fixed gear 4 of the first transmission input shaft w_k1 engages with idler gear 10 of the first countershaft w_v1 as well as with idler gear 16 of the second countershaft w_v2. In the fourth gear plane 11-17 as dual gear plane, fixed gear 5 of the first transmission input shaft w_k1 meshes with idler gear 11 of the first countershaft w_v1 as well as with idler gear 17 of the second countershaft w_v2. Finally, fixed gear 6 of the first transmission input shaft w_k1 engages in the fifth gear plane 12-18 as dual gear plane with idler gear 12 of the first countershaft w_v1 as well as with intermediate gear ZR for rotation reversal for the reverse gear transmission ratios, wherein intermediate gear ZR engages also with idler gear 18 of the second countershaft w_v2.

Figure 25:
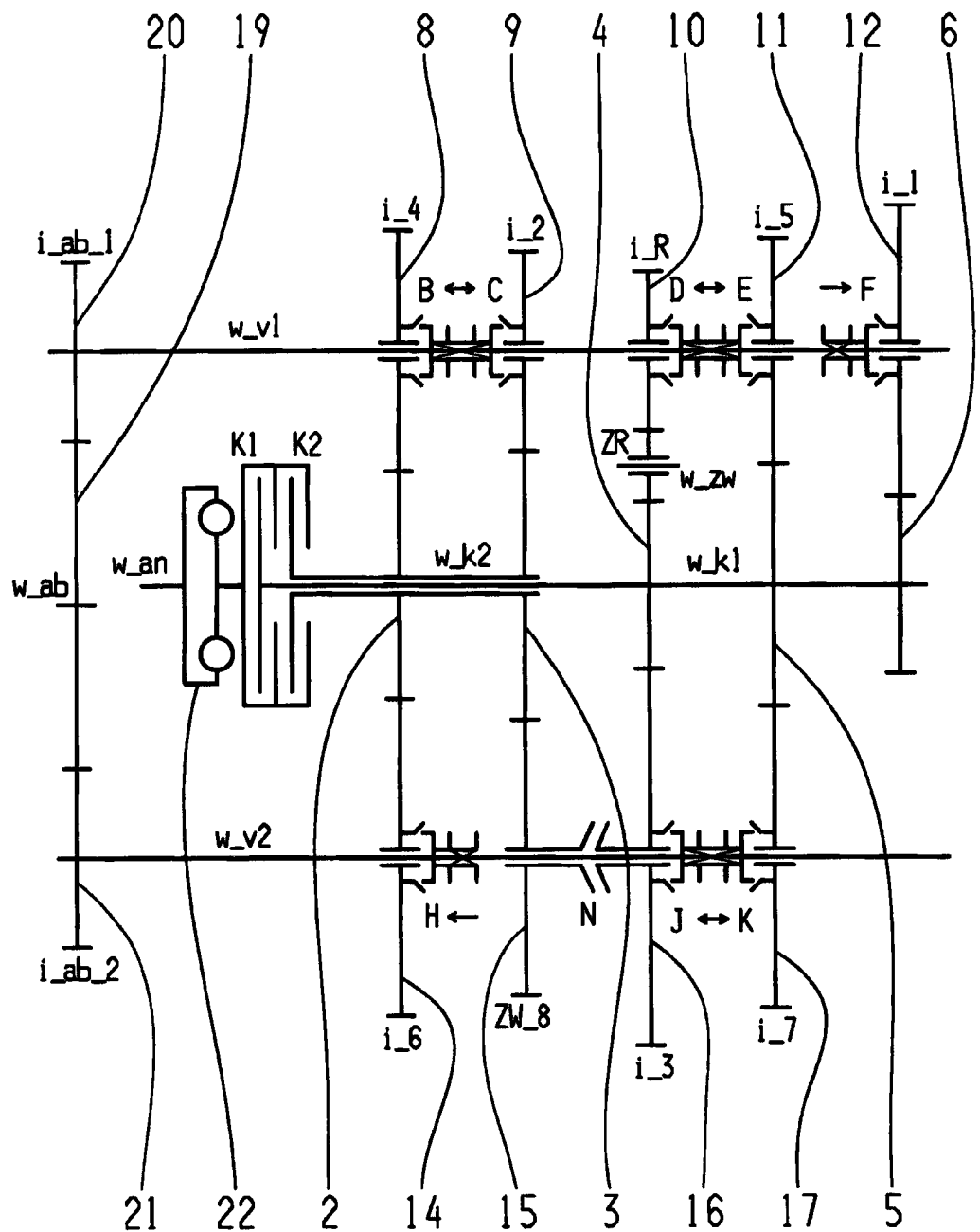
FIG. 25 a schematic view of a thirteenth variant embodiment of the eight-speed-double-clutch transmission according to the invention.

In the thirteenth variant embodiment according to FIGS. 25 and 26, fixed gear 2 of the second transmission input shaft w_k2 meshes in the first gear plane 8-14 as dual gear plane with idler gear 8 of the first countershaft w_v1 as well as with idler gear 14 of the second countershaft w_v2. In the second gear plane 9-15 as dual gear plane, fixed gear 3 of the second transmission input shaft w_k2 engages with idler gear 9 of the first countershaft w_v1 as well as with idler gear 15 of the second countershaft w_v2. In the third gear plane 10-16 as dual gear plane, fixed gear 4 of the first transmission input shaft w_k1 engages with idler gear 16 of the second countershaft w_v2 as well as with intermediate gear ZR for rotation reversal for the reverse gear transmission ratios, wherein intermediate gear ZR engages also with idler gear 10 of the first countershaft w_v1. In the fourth gear plane 11-14 as dual gear plane, fixed gear 5 of the first transmission input shaft w_k1 meshes with idler gear 11 of the first countershaft w_v1 and with idler gear 17 of the second countershaft w_v2. Finally, fixed gear 6 of the first transmission input shaft w_k1 meshes in the fifth gear plane 12-6 as single gear plane with idler gear 12 of the first countershaft w_v1.

Figure 27:
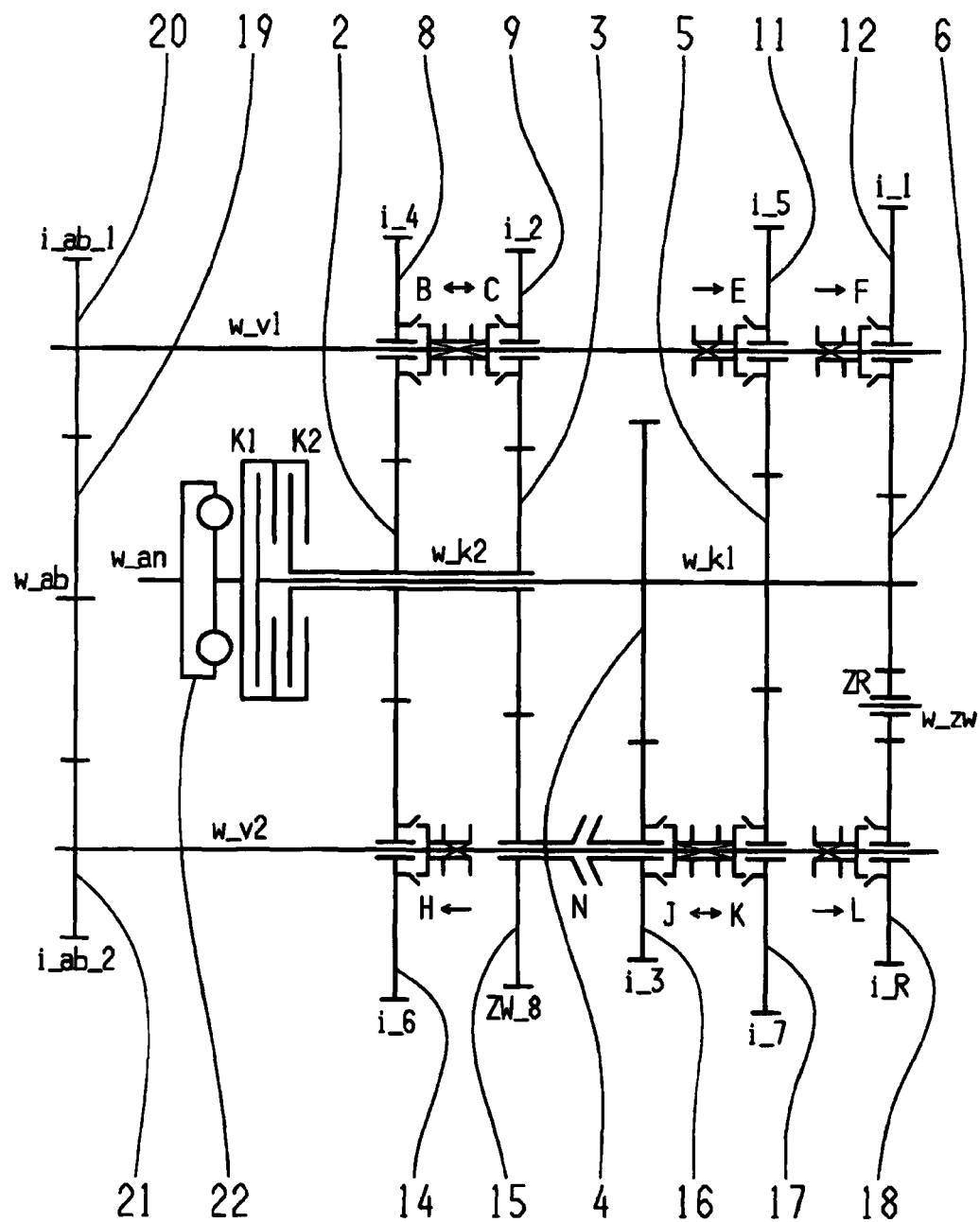
FIG. 27 a schematic view of a fourteenth variant embodiment of the eight-speed-double-clutch transmission according to the invention.

In the fourteenth variant embodiment according to FIGS. 27 and 28, fixed gear 2 of the second transmission input shaft w_k2 meshes in the first gear plane 8-14 as dual gear plane with idler gear 8 of the first countershaft w_v1 as well as with idler gear 14 of the second countershaft w_v2. In the second gear plane 9-15 as dual gear plane, fixed gear 3 of the second transmission input shaft w_k2 engages with idler gear 9 of the first countershaft w_v1 as well as with idler gear 15 of the second countershaft w_v2. In the third gear plane 4-16 as single gear plane, fixed gear 4 of the first transmission input shaft w_k1 engages with idler gear 16 of the second countershaft w_v2. In the fourth gear plane 11-17 as dual gear plane, fixed gear 5 of the first transmission input shaft w_k1 engages with idler gear 11 of the first countershaft w_v1 as well as with idler gear 17 of the second countershaft w_v2. Finally, fixed gear 6 of the first transmission input shaft w_k1 meshes in the fifth gear plane 12-18 as dual gear plane with idler gear 12 of the first countershaft w_v1 as well as with intermediate gear ZR for rotation reversal for the reverse gear transmission ratios, wherein the intermediate gear ZR engages also with idler gear 18 of the second countershaft w_v2.

In the first variant embodiment according to FIG. 1, two double-acting coupling devices A-B and C-D are provided on the first countershaft w_v1, wherein the coupling devices A-B and C-D are arranged such that to the first countershaft w_v1 are firmly connected idler gear 7 by the activated coupling device A, idler gear 8 by the activated coupling device B, idler gear 9 by the activated coupling device C and idler gear 10 by the activated coupling device D. Furthermore, on the second countershaft w_v2, a double-acting coupling device E-F and a single-acting coupling device G are provided, wherein the coupling devices E-F and G are arranged such that to the second countershaft w_v2 are firmly connected idler gear 13 by the activated coupling device E, idler gear 14 by the activated coupling device F, idler gear 15 by the activated coupling device G.

In the second and sixth variant embodiment according to FIGS. 3 and 11, one doubly acting coupling device B-C and two singly acting coupling devices A and D are provided on the first countershaft w_v1, which are arranged such that to the first countershaft w_v1 are firmly connected idler gear 7 by the activated coupling device A, idler gear 8 by the activated coupling device B, idler gear 9 by the activated coupling device C, and idler gear 10 by the activated coupling device D. On the second countershaft w_v2, two doubly acting coupling devices H-I and J-K are provided, which are arranged such that to the second countershaft w_v2 are firmly connected idler gear 14 by the activated coupling device H, idler gear 15 by the activated coupling device I, idler gear 16 by the activated coupling device J and idler gear 17 by the activated coupling device K.

In the third and ninth variant embodiments according to FIGS. 5 and 17, two doubly acting coupling devices B-C and D-E and one singly acting coupling device A are provided on the first countershaft w_v1, which are arranged such that to the first countershaft w_v1 are firmly connected idler gear 7 by the activated coupling device A, idler gear 8 by the activated coupling device B, idler gear 9 by the activated coupling device C, idler gear 10 by the activated coupling device D, and idler gear 11 by the activated coupling device E. On the second countershaft w_v2 one doubly acting coupling device J-K and one singly acting coupling device G or I are provided, which are arranged such that to the second countershaft w_v2 are firmly connected idler gear 13 by the activated coupling device G, idler gear 15 by the activated coupling device I, idler gear 16 by activated coupling device J, and idler gear 17 by the activated coupling device K.

In the fourth variant embodiment according to FIG. 7, three singly acting coupling devices A, C and D are provided on the first countershaft w_v1, which are arranged such that to the first countershaft w_v1 are firmly connected idler gear 7 by the activated coupling device A, idler gear 9 by the activated coupling device C, and the idler gear 10 by activated coupling device D. On the second countershaft w_v2, two doubly acting coupling devices H-I and J-K and one singly acting coupling device G are provided, which are arranged such that to the second countershaft are firmly connected idler gear 13 by the activated coupling device G, idler gear 14 by the activated coupling device H, idler gear 15 by the activated coupling device I idler gear 16 by the activated coupling device J, and idler gear 17 by the activated coupling device K.

In the fifth variant embodiment according to FIG. 9, two double acting coupling devices A-B and C-D are provided on the first countershaft w_v1, which are arranged such that to said first countershaft w_v1 are firmly connected idler gear 7 by activated coupling device A, idler gear 8 by activated coupling device B, idler gear 9 by activated coupling device C and idler gear 10 by activated coupling device D. On the second countershaft w_v2 are provided two doubly acting coupling devices E-F and G-H, which are arranged such that to said second countershaft w_v2 are firmly connected idler gear 13 by activated coupling device E, idler gear 14 by activated coupling device F, idler gear 15 by activated coupling device G, and idler gear 16 by activated coupling device H.

In the seventh and fifteenth variant embodiment according to FIGS. 13 and 29, two doubly acting coupling devices B-C and D-E are provided on the first countershaft w_v1, which are arranged such that to said first countershaft w_v1 are firmly connected idler gear 8 by coupling device B, idler gear 9 by coupling device C, idler gear 10 by coupling device D and idler gear 11 by activated coupling device E. On the second countershaft w_v2 are a double acting coupling device H-I and two single acting coupling devices G and J or K and L, which are arranged such that to said second countershaft w_v2 are firmly connected idler gear 13 by activated coupling device G, idler gear 14 by activated coupling device H, idler gear 15 by activated coupling device I, idler gear 16 by activated coupling device J, idler gear 17 by activated coupling device K and idler gear 18 by activated coupling device L.

In the eighth variant embodiment according to FIG. 15, two double acting coupling devices B-C and D-E and one single acting coupling device A are provided on the first countershaft w_v1, which are arranged such that to said first countershaft w_v1 are firmly connected idler gear 7 by activated coupling device A, idler gear 8 by activated coupling device B, idler gear 9 by activated coupling device C, idler gear 10 by activated coupling device D and idler gear 11 by activated coupling device E. On the second countershaft w_v2, three single acting coupling devices G, H and J are provided, which are arranged such that to the second countershaft w_v2 are firmly connected idler gear 13 by activated coupling device G, idler gear 14 by activated coupling device H, and idler gear 16 by activated coupling device J.

In the tenth, twelfth and fourteenth variant embodiment according to FIGS. 19, 23 and 27, one double acting coupling device B-C or D-E and two single acting coupling devices A and C or B and F or E and F are provided on first countershaft w_v1, which are arranged such that to said first countershaft are firmly connected idler gear 7 by coupling device A, idler gear 8 by activated coupling device B, idler gear 9 by activated coupling device C, idler gear 10 by activated coupling device D, idler gear 11 by activated coupling device E, and idler gear 12 by activated coupling device F. On the second countershaft w_v2, one single acting coupling device H-I or J-K and two single acting coupling devices G and K or K and L or H and L are provided, which are arranged such that to said second countershaft w_v2 are firmly connected idler gear 13 by activated coupling device G, idler gear 14 by activated coupling device H, idler gear 15 by activated coupling device I, idler gear 16 by activated coupling device J, idler gear 17 by activated coupling device K and idler gear 18 by activated coupling device L.

In the eleventh and thirteenth variant embodiment according to FIGS. 21 and 25, two double acting coupling devices B-C and D-E and one single acting coupling device F are provided on the first countershaft w_v1, which are arranged such that to said first countershaft w_v1 are firmly connected idler gear 8 by activated coupling device B, idler gear 9 by activated coupling device C, idler gear 10 by activated coupling device D, idler gear 11 by activated coupling device E and idler gear 12 by activated coupling device F. On the second countershaft, one double acting coupling device H-I or J-K and one single acting coupling device K or H are provided, which are arranged such that to said second countershaft w_v2 are firmly connected idler gear 14 by activated coupling device H, idler gear 15 by activated coupling device I, idler gear 16 by activated coupling device J, and idler gear 17 by activated coupling device K.

Independent of the specific variant embodiments, in the double clutch transmission according to the invention, an integrated output stage is provided by power take-off gear 20 and power take-off gear 21. Power take-off gear 20 and power take-off gear 21 each engage with a fixed gear 19 of the output shaft w_ab. Optionally, shiftable connections can be realized between power take-off gears 20, 21 on the one hand and the assigned countershafts w_v1, w_v2 on the other hand by means of shiftable coupling devices S_ab1, S_ab2.

Furthermore, with the double clutch transmission it turns out that at least the forward gears G1 to G8 are feasibly power shiftable. Depending on the variant embodiment, at least one additional reverse gear and/or crawler gears and/or overdrive gears, for example, also as winding path gears, are feasible as power shiftable gears. Details for each variant embodiment are shown from the following described shift patterns.

In the table represented in FIG. 2, a shift pattern is shown for the first variant embodiment of the eight-speed double clutch transmission, for example, according to FIG. 1.

The shift pattern shows that first forward gear G1 is shiftable by means of the first clutch K1, the activated coupling device A and the activated shift element P as winding path gear, that the second forward gear G2 is shiftable by means of the second clutch K2 and the activated coupling device A, that the third forward gear G3 is shiftable by means of the first clutch K1 and activated coupling device G, that the fourth forward gear G4 is shiftable by means of second clutch K2 and activated coupling device F, that the fifth forward gear G5 is shiftable by means of the first clutch K1 and the activated coupling device C, that the sixth forward gear G6 is shiftable by means of the second clutch K2 and the activated coupling device B, that the seventh forward gear G7 is shiftable by means of the first clutch K1 and activated coupling device D, and that the eighth forward gear G8 is shiftable by means of the second clutch K2, the activated coupling device D and the activated shift element P as winding path gear. Thus, at least the first eight forward gears are feasible as power shiftable gears (Isb.).

In addition, a reverse gear R1, for example, can be shifted by means of the second clutch K2 and the activated coupling device E. A reverse gear R2 can be shifted by means of the second clutch K2, the activated coupling device C, the activated coupling device E, the activated coupling device H, and by coupling device S_ab2 when it is disengaged as winding path gear. Furthermore, a reverse gear R3 can be shifted by means of the first clutch K1 and the activated coupling device E, and when shift element O is activated as winding path gear. In addition, a reverse gear R4 can be shifted by means of the first clutch K1 and the activated coupling device E, and by shift element P when activated as winding path gear. A reverse gear R5 can be shifted by means of the first clutch K1, the activated coupling device B, the activated coupling device D, activated coupling device E and by coupling device S_ab1 when disengaged as winding path gear. A reverse gear R6 can be shifted by means of the second clutch K2, activated coupling device A, activated coupling device C, activated coupling device H, and by coupling device S_ab1 when disengaged as winding path gear. A reverse gear R7 can be shifted by means of the second clutch K2, activated coupling device A, activated coupling device D, activated coupling device H and by coupling device S_ab1 when disengaged as winding path gear. Finally, a reverse gear R8 can be shifted by means of the second clutch K2, activated coupling device C, activated coupling device E, activated coupling device H, and by coupling device S_ab2 when disengaged as winding path gear.

In addition, the shift pattern according to FIG. 2 shows that a crawler gear C1 is shiftable by means of the second clutch K2 and by means of activated coupling device A, by means of activated coupling device C and by means of activated coupling device G and by winding path gear-coupling device S_ab1 when disengaged, as winding path gear. A crawler gear C2 can be shifted by means of the second clutch K2, by means of activated coupling device A, by means of activated coupling device D and by means of activated coupling device G and by winding path gear-coupling device S_ab1 when disengaged, as winding path gear. A crawler gear C3 can be shifted by means of the first clutch K1 and by means of activated coupling device A and by means of activated shift element O as winding path gear.

Finally, an overdrive gear O1 is shiftable by means of the second clutch K2 and by means of activated coupling device D, and by means of activated shift element O as winding path gear. An overdrive gear O2 can be shifted by means of the first clutch K1, by means of activated coupling device A, by means of activated coupling device D and by means of activated coupling device F and by winding path gear-coupling device S_ab1 when disengaged, as winding path gear.

The table represented in FIG. 4 shows, as an example, a shift pattern for the second variant embodiment of the eight-speed-double clutch transmission according to FIG. 3.

The shift pattern shows that first forward gear G1 is shiftable by means of the first clutch K1, the activated coupling device A and the activated shift element N as winding path gear, that the second forward gear G2 is shiftable by means of the second clutch K2 and the activated coupling device A, that the third forward gear G3 is shiftable by means of the first clutch K1 and activated coupling device J, that the fourth forward gear G4 is shiftable by means of second clutch K2 and activated coupling device I, that the fifth forward gear G5 is shiftable by means of the first clutch K1 and the activated coupling device D, that the sixth forward gear G6 is shiftable by means of the second clutch K2 and the activated coupling device B, that the seventh forward gear G7 is shiftable by means of the first clutch K1 and activated coupling device K, and that the eighth forward gear G8 is shiftable by means of the second clutch K2 and the activated coupling device C. Thus, at least the first eight forward gears can be designed as power shiftable gears (Isb.).

In addition, a reverse gear R1, for example, can be shifted by means of the second clutch K2 and the activated coupling device H. A reverse gear R2 can be shifted by means of the first clutch K1 and the activated coupling device H as well as the activated shift element M as winding path gear. Furthermore, a reverse gear R3 can be shifted by means of the first clutch K1, the activated coupling device H, and an activated shift element N as winding path gear.

Finally, an overdrive gear O1 can also be shifted by means of the second clutch K2, the activated coupling device K, and the activated shift element M as winding path gear. An overdrive gear O2 can be shifted by means of the second clutch K2, the activated coupling device K and the activated shift element N as winding path gear.

A shift pattern for the third variant embodiment of the eight-speed double clutch transmission according to FIG. 5 is shown in a table represented in FIG. 6.

The shift pattern shows that first forward gear G1 is shiftable by means of the first clutch K1, the activated coupling device A and the activated shift element N as winding path gear, that the second forward gear G2 is shiftable by means of the second clutch K2 and the activated coupling device A, that the third forward gear G3 is shiftable by means of the first clutch K1 and activated coupling device J, that the fourth forward gear G4 is shiftable by means of second clutch K2 and activated coupling device I, that the fifth forward gear G5 is shiftable by means of the first clutch K1 and the activated coupling device K, that the sixth forward gear G6 is shiftable by means of the second clutch K2 and the activated coupling device C, that the seventh forward gear G7 is shiftable by means of the first clutch K1 and activated coupling device E, and that the eighth forward gear G8 is shiftable by means of the second clutch K2 and the activated coupling device B. Thus, at least the first eight forward gears can be designed as power shiftable gears (Isb.).

In addition, a reverse gear R1, for example, can be shifted by means of the first clutch K1 and the activated coupling device D. A reverse gear R2 can be shifted by means of the first clutch K1, the activated coupling device A, and the activated shift element M as winding path gear. Furthermore, a reverse gear R3 can be shifted by means of the first clutch K1, the activated coupling device B, and an activated shift element M as winding path gear. A reverse gear R4 can be shifted by means of the first clutch K1, the activated coupling device I, and the activated shift element M as winding path gear. Moreover, a reverse gear R5 can be shifted by means of the second clutch K2, the activated coupling device D, and the activated shift element N as winding path gear.

Finally, an overdrive gear O1 can be shifted by means of the second clutch K2, the activated coupling device E, and the activated shift element N as winding path gear.

A shift pattern for the fourth variant embodiment of the eight-speed-double clutch transmission according to FIG. 7 is, for example, shown in the table represented in FIG. 8.

It is evident from the shift pattern that first forward gear G1 is shiftable by means of the first clutch K1, the activated coupling device A and the activated shift element N as winding path gear, that the second forward gear G2 is shiftable by means of the second clutch K2 and the activated coupling device A, that the third forward gear G3 is shiftable by means of the first clutch K1 and activated coupling device J, that the fourth forward gear G4 is shiftable by means of second clutch K2 and activated coupling device I, that the fifth forward gear G5 is shiftable by means of the first clutch K1 and the activated coupling device D, that the sixth forward gear G6 is shiftable by means of the second clutch K2 and the activated coupling device H, that the seventh forward gear G7 is shiftable by means of the first clutch K1 and activated coupling device K, and that the eighth forward gear G8 is shiftable by means of the second clutch K2 and the activated coupling device C. Thus, at least the first eight forward gears can be designed as power shiftable gears (Isb.).

Moreover, in the fourth variant embodiment, the following gears can be shifted: a reverse gear R1 by means of the second clutch K2 and the activated coupling device G and/or a reverse gear R2 by means of the first clutch k1, the activated coupling device G and the activated shift element M as winding path gear and/or a reverse gear R3 by means of the first clutch k1, the activated coupling device G and an activated shift element N as winding path gear.

A crawler gear C1 can be shifted by means of the first clutch K1, the activated coupling device A and an activated shift element M as winding path gear.

Finally, an overdrive gear O1 can be shifted by means of the second clutch K2, the activated coupling device K and the activated shift element M as winding path gear and/or an overdrive gear O2 can be shifted by means of the second clutch K2, the activated coupling device K and an activated shift element N as winding path gear.

A shift pattern for the fifth variant embodiment of the eight-speed-double clutch transmission according to FIG. 9 can be seen in the table represented in FIG. 10.

It is evident from the shift pattern that first forward gear G1 is shiftable by means of the first clutch K1, the activated coupling device E and the activated shift element P as winding path gear, that the second forward gear G2 is shiftable by means of the second clutch K2 and the activated coupling device E, that the third forward gear G3 is shiftable by means of the first clutch K1 and activated coupling device G, that the fourth forward gear G4 is shiftable by means of second clutch K2 and activated coupling device F, that the fifth forward gear G5 is shiftable by means of the first clutch K1 and the activated coupling device D, that the sixth forward gear G6 is shiftable by means of the second clutch K2 and the activated coupling device A, that the seventh forward gear G7 is shiftable by means of the first clutch K1 and activated coupling device C, and that the eighth forward gear G8 is shiftable by means of the second clutch K2 and the activated coupling device B. Thus, at least the first eight forward gears can be designed as power shiftable gears (Isb.).

In addition, in the fifth variant embodiment, a reverse gear R1 can be shifted by means of the first clutch K1 and the activated coupling device H and/or a reverse gear R2 can be shifted by means of the second clutch K2, the activated coupling device A, the activated coupling device C, and the activated coupling device H and by winding path gear-coupling device S_ab1 when disengaged, as a winding path gear.

A crawler gear C1 can be shifted by means of the first clutch K1, the activated coupling device B, activated coupling device D and the activated coupling device E and when coupling device S_ab1 is disengaged, as winding path gear.

Finally, an overdrive gear O1 can be shifted by means of the second clutch K2, the activated coupling device C and the activated shift element P as winding path gear and/or an overdrive gear O2 can be shifted by means of the first clutch K2, the activated coupling device B, activated coupling device E, and activated coupling device G as well as by winding path gear-coupling device S_ab2 when disengaged, as a winding path gear.

Advantageously, overdrive gear O2 can be designed as power shiftable to the eighth forward gear G8.

From the table represented in FIG. 12, a shift pattern for the sixth variant embodiment of the eight-speed-double clutch transmission according to FIG. 11, is shown as an example.

The shift pattern shows that first forward gear G1 is shiftable by means of the first clutch K1, the activated coupling device H and the activated shift element N as winding path gear, that the second forward gear G2 is shiftable by means of the second clutch K2 and the activated coupling device H, that the third forward gear G3 is shiftable by means of the first clutch K1 and activated coupling device D, that the fourth forward gear G4 is shiftable by means of second clutch K2 and activated coupling device C, that the fifth forward gear G5 is shiftable by means of the first clutch K1 and the activated coupling device J, that the sixth forward gear G6 is shiftable by means of the second clutch K2 and the activated coupling device A, that the seventh forward gear G7 is shiftable by means of the first clutch K1 and activated coupling device K, and that the eighth forward gear G8 is shiftable by means of the second clutch K2 and the activated coupling device I. Thus, at least the first eight forward gears can be designed as power shiftable gears (Isb.).

Moreover, in the sixth variant embodiment, the following gears can be shifted: a reverse gear R1 by means of the second clutch K2 and the activated coupling device B and/or a reverse gear R2 by means of the first clutch k1, the activated coupling device B and the activated shift element M as winding path gear and/or a reverse gear R3 by means of the first clutch k1, the activated coupling device K and an activated shift element N as winding path gear.

Finally, an overdrive gear O1 can be shifted by means of the second clutch K2 and by means of activated coupling device K and by means of activated shift element M as winding path gear, and/or an overdrive gear O2 can be shifted by means of the second clutch K2 and by means of the activated coupling device K as well as by an activated shift element N as winding path gear.

The table represented in FIG. 14 shows a shift pattern for the seventh variant embodiment of the eight-speed-double clutch transmission according to FIG. 13, as an example.

The shift pattern shows that first forward gear G1 is shiftable by means of the first clutch K1, the activated coupling device G and the activated shift element N as winding path gear, that the second forward gear G2 is shiftable by means of the second clutch K2 and the activated coupling device G, that the third forward gear G3 is shiftable by means of the first clutch K1 and activated coupling device D, that the fourth forward gear G4 is shiftable by means of second clutch K2 and activated coupling device C, that the fifth forward gear G5 is shiftable by means of the first clutch K1 and the activated coupling device J, that the sixth forward gear G6 is shiftable by means of the second clutch K2 and the activated coupling device H, that the seventh forward gear G7 is shiftable by means of the first clutch K1 and activated coupling device E, and that the eighth forward gear G8 is shiftable by means of the second clutch K2 and the activated coupling device I. Thus, at least the first eight forward gears can be designed as power shiftable gears (Isb.).

Moreover, in the seventh variant embodiment, the following reverse gears can be shifted: a reverse gear R1 by means of the second clutch K2 and the activated coupling device B and/or a reverse gear R2 by means of the first clutch k1, the activated coupling device B and the activated shift element M as winding path gear and/or a reverse gear R3 by means of the first clutch K1, the activated coupling device B and an activated shift element N as winding path gear.

Finally, an overdrive gear O1 can be shifted by means of the second clutch K2, the activated coupling device E and the activated shift element M as winding path gear and/or an overdrive gear O2 can be shifted by means of the second clutch K2, the activated coupling device E, and activated shift element N as winding path gear.

The table represented in FIG. 16 shows a shift pattern for the eighth variant embodiment of the eight-speed-double clutch transmission according to FIG. 15, as an example.

The shift pattern shows that first forward gear G1 is shiftable by means of the first clutch K1, the activated coupling device H and the activated shift element N as winding path gear, that the second forward gear G2 is shiftable by means of the second clutch K2 and the activated coupling device H, that the third forward gear G3 is shiftable by means of the first clutch K1 and activated coupling device E, that the fourth forward gear G4 is shiftable by means of second clutch K2 and activated coupling device A, that the fifth forward gear G5 is shiftable by means of the first clutch K1 and the activated coupling device D, that the sixth forward gear G6 is shiftable by means of the second clutch K2 and the activated coupling device G, that the seventh forward gear G7 is shiftable by means of the first clutch K1 and activated coupling device J, and that the eighth forward gear G8 is shiftable by means of the second clutch K2 and the activated coupling device C. Thus, at least the first eight forward gears can be designed as power shiftable gears (Isb.).

In addition, in the eighth variant embodiment, the following gears can be shifted: a reverse gear R1 by means of the second clutch K2 and the activated coupling device B and/or a reverse gear R2 by means of the first clutch K1, the activated coupling device B and the activated shift element M as winding path gear. A reverse gear R3 can be shifted by means of the first clutch K1, the activated coupling device B and an activated shift element N as winding path gear.

A crawler gear C1 can be shifted by means of the first clutch K1, the activated coupling device H, and the activated shift element M as winding path gear. Finally, an overdrive gear O1 can be shifted by means of the second clutch K2, activated coupling device J and the activated shift element M as winding path gear.

The table represented in FIG. 18 shows, as an example, a shift pattern for the ninth variant embodiment of the eight-speed-double clutch transmission according to FIG. 17.

The shift pattern shows that first forward gear G1 is shiftable by means of the first clutch K1, the activated coupling device B and the activated shift element N as winding path gear, that the second forward gear G2 is shiftable by means of the second clutch K2 and the activated coupling device B, that the third forward gear G3 is shiftable by means of the first clutch K1 and activated coupling device K, that the fourth forward gear G4 is shiftable by means of second clutch K2 and activated coupling device A, that the fifth forward gear G5 is shiftable by means of the first clutch K1 and the activated coupling device D, that the sixth forward gear G6 is shiftable by means of the second clutch K2 and the activated coupling device G, that the seventh forward gear G7 is shiftable by means of the first clutch K1 and activated coupling device J, and that the eighth forward gear G8 is shiftable by means of the second clutch K2 and the activated coupling device C. Thus, at least the first eight forward gears can be designed as power shiftable gears (Isb.).

In addition, in the ninth variant embodiment, the following gears can be shifted: a reverse gear R1 by means of the first clutch K1 and the activated coupling device E and/or a reverse gear R2 by means of the second clutch K2, the activated coupling device E and the activated shift element N as winding path gear.

A crawler gear C1 can be shifted by means of the first clutch K1, the activated coupling device B, and activated shift element M as winding path gear. Finally, an overdrive gear O1 can be shifted by means of the second clutch K2, the activated coupling device J and the activated shift element M as winding path gear.

The table in FIG. 20 shows as an example a shift pattern for the tenth variant embodiment of the eight-speed-double clutch transmission according to FIG. 19.

The shift pattern shows that first forward gear G1 is shiftable by means of the first clutch K1, the activated coupling device G and the activated shift element N as winding path gear, that the second forward gear G2 is shiftable by means of the second clutch K2 and the activated coupling device G, that the third forward gear G3 is shiftable by means of the first clutch K1 and activated coupling device D, that the fourth forward gear G4 is shiftable by means of the second clutch K2 and activated coupling device C, that the fifth forward gear G5 is shiftable by means of the first clutch K1 and the activated coupling device E, that the sixth forward gear G6 is shiftable by means of the second clutch K2 and the activated coupling device I, that the seventh forward gear G7 is shiftable by means of the first clutch K1 and activated coupling device K, and that the eighth forward gear G8 is shiftable by means of the second clutch K2 and the activated coupling device H. Thus, at least the first eight forward gears can be designed as power shiftable gears (Isb.).

In addition, in the tenth variant embodiment, the following gears can be shifted: a reverse gear R1 by means of the second clutch K2 and the activated coupling device A and/or a reverse gear R2 by means of the first clutch K1, the activated coupling device A and the activated shift element M as winding path gear, and/or a reverse gear R3 by means of the first clutch K1, the activated coupling device A and an activated shift element N as winding path gear.

Finally, an overdrive gear O1 can be shifted by means of the second clutch K2, the activated coupling device K and the activated shift element M as winding path gear and/or an overdrive gear O2 can be shifted by means of the second clutch K2, the activated coupling device K, and activated shift element N as winding path gear.

The table in FIG. 22 shows as an example a shift pattern for the eleventh variant embodiment of the eight-speed-double clutch transmission according to FIG. 21.

The shift pattern shows that the first forward gear G1 is shiftable by means of the first clutch K1 and the activated coupling device F, that the second forward gear G2 is shiftable by means of the second clutch K2 and the activated coupling device B, that the third forward gear G3 is shiftable by means of the first clutch K1 and activated coupling device D, that the fourth forward gear G4 is shiftable by means of second clutch K2 and activated coupling device H, that the fifth forward gear G5 is shiftable by means of the first clutch K1 and the activated coupling device E, that the sixth forward gear G6 is shiftable by means of the second clutch K2 and the activated coupling device I, that the seventh forward gear G7 is shiftable by means of the first clutch K1 and activated coupling device K, and that the eighth forward gear G8 is shiftable by means of the second clutch K2 and the activated coupling device K as well as the activated shift element N as winding path gear. Thus, at least the first eight forward gears can be designed as power shiftable gears (Isb.).

In addition, in the eleventh variant embodiment, the following gears can be shifted: a reverse gear R1 by means of the second clutch K2 and the activated coupling device C and/or a reverse gear R2 by means of the second clutch K2, the activated coupling device E and the activated shift element M as winding path gear. A crawler gear R3 can be shifted by means of the second clutch K1, the activated coupling device F and an activated shift element M as winding path gear. Finally, a reverse gear R4 can be shifted by means of the first clutch K1, the activated coupling device C, and the activated shift element N as winding path gear. The reverse gear R3 can be advantageously designed to be power shiftable.

The table in FIG. 24 shows, as an example, a shift pattern for the twelfth variant embodiment of the eight-speed-double clutch transmission according to FIG. 23.

It is evident from the shift pattern that first forward gear G1 is shiftable by means of the first clutch K1 and the activated coupling device F, that the second forward gear G2 is shiftable by means of the second clutch K2 and the activated coupling device B, that the third forward gear G3 is shiftable by means of the first clutch K1 and activated coupling device D, that the fourth forward gear G4 is shiftable by means of second clutch K2 and activated coupling device H, that the fifth forward gear G5 is shiftable by means of the first clutch K1 and the activated coupling device E, that the sixth forward gear G6 is shiftable by means of the second clutch K2 and the activated coupling device I, that the seventh forward gear G7 is shiftable by means of the first clutch K1 and activated coupling device K, and that the eighth forward gear G8 is shiftable by means of the second clutch K2 and the activated coupling device K as well as the activated shift element N as winding path gear. Thus, at least the first eight forward gears can be designed as power shiftable gears (Isb.).

In addition, in the twelfth variant embodiment, a reverse gear R1 can be shifted by means of the first clutch K1 and the activated coupling device L and/or a reverse gear R2 can be shifted by means of the second clutch K2, the activated shift element L and the activated shift element N as winding path gear.

The table in FIG. 26 shows a shift pattern as an example for the thirteenth variant embodiment of the eight-speed-double clutch transmission according to FIG. 25.

From the shift pattern it turns out that first forward gear G1 is shiftable by means of the first clutch K1 and the activated coupling device F, that the second forward gear G2 is shiftable by means of the second clutch K2 and the activated coupling device C, that the third forward gear G3 is shiftable by means of the first clutch K1 and activated coupling device J, that the fourth forward gear G4 is shiftable by means of second clutch K2 and activated coupling device B, that the fifth forward gear G5 is shiftable by means of the first clutch K1 and the activated coupling device E, that the sixth forward gear G6 is shiftable by means of the second clutch K2 and the activated coupling device H, that the seventh forward gear G7 is shiftable by means of the first clutch K1 and activated coupling device K, and that the eighth forward gear G8 is shiftable by means of the second clutch K2 and the activated coupling device K as well as the activated shift element N as winding path gear. Thus, at least the first eight forward gears can be designed as power shiftable gears.

In addition, in the thirteenth variant embodiment, the following reverse gears can be shifted: a reverse gear R1 by means of the first clutch K1 and the activated coupling device D, and/or a reverse gear R2 by means of the second clutch K2, the activated coupling device F and the activated shift element M as winding path gear, and/or a reverse gear R3 by means of the second clutch K2, the activated coupling device D and an activated shift element N as winding path gear. Reverse gear R2 can be designed advantageously as power shiftable (Isb.) especially to the first forward gear G1.

The table represented in FIG. 28 shows a shift pattern, as an example, for the fourteenth variant embodiment of the eight-speed-double clutch transmission according to FIG. 27.

From the shift pattern it turns out that first forward gear G1 is shiftable by means of the first clutch K1 and the activated coupling device F, that the second forward gear G2 is shiftable by means of the second clutch K2 and the activated coupling device C, that the third forward gear G3 is shiftable by means of the first clutch K1 and activated coupling device J, that the fourth forward gear G4 is shiftable by means of second clutch K2 and activated coupling device B, that the fifth forward gear G5 is shiftable by means of the first clutch K1 and the activated coupling device E, that the sixth forward gear G6 is shiftable by means of the second clutch K2 and the activated coupling device H, that the seventh forward gear G7 is shiftable by means of the first clutch K1 and activated coupling device K, and that the eighth forward gear G8 is shiftable by means of the second clutch K2 and the activated coupling device K as well as the activated shift element N as winding path gear. Thus, at least the first eight forward gears can be designed as power shiftable gears.

In addition, in the fourteenth variant embodiment, a reverse gear R1 can be shifted by means of the first clutch K1 and the activated coupling device L and/or a reverse gear R2 can be shifted by means of the second clutch K2, the activated shift element L and the activated shift element N as winding path gear.

The table represented in FIG. 30 shows a shift pattern, as an example, for the fifteenth variant embodiment of the eight-speed-double clutch transmission according to FIG. 29.

The shift pattern shows that first forward gear O1 is shiftable by means of the first clutch K1 and the activated coupling device D, that the second forward gear G2 is shiftable by means of the second clutch K2 and the activated coupling device I, that the third forward gear G3 is shiftable by means of the first clutch K1 and activated coupling device E, that the fourth forward gear G4 is shiftable by means of second clutch K2 and activated coupling device B, that the fifth forward gear G5 is shiftable by means of the first clutch K1 and the activated coupling device K, that the sixth forward gear G6 is shiftable by means of the second clutch K2 and the activated coupling device H, that the seventh forward gear G7 is shiftable by means of the first clutch K1 and activated coupling device L, and that the eighth forward gear G8 is shiftable by means of the second clutch K2 and the activated coupling device L as well as the activated shift element N as winding path gear. Thus, at least the first eight forward gears can be designed as power shiftable gears.

In addition, in the fifteenth variant embodiment, the following reverse gears can be shifted: a reverse gear R1 by means of the second clutch K2 and the activated coupling device C, and/or a reverse gear R2 by means of the first clutch K1, the activated coupling device I and the activated shift element M, and/or a reverse gear R3 by means of the first clutch K1, the activated coupling device C and an activated shift element N as winding path gear.

The shift pattern of the first variant embodiment according to FIG. 2 shows in detail that in the first forward gear G1, starting from the first clutch K1, gear stages i_3, i_4 and i_2 are used, wherein the coupling of the two subtransmissions occurs by means of activated shift element P. In the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8, starting from the second clutch K2, gear stages i_4, i_3 and i_7 are used, wherein the two subtransmissions are coupled with each other by means of activated shift element P.

In the shift pattern of the first variant embodiment according to FIG. 2, gear stage i_R is used in reverse gear R1, starting from the second clutch K2. Furthermore, in the reverse gear R2, starting from the second clutch K2, gear stages i_R, _x8 and i_5 are used, wherein a winding path gear-coupling device S_ab2 is disengaged for the coupling of the two subtransmissions. In reverse gear R3, starting from the first clutch K1, gear stages i_5, i_6 and i_R are used, wherein the two subtransmissions are coupled with each other by means of activated shift element O. In the reverse gear R4, starting from the first clutch K1, gear stages i_3, i_4 and i_R are used, wherein the two subtransmissions are coupled with each other by means of activated shift element P. In reverse gear R5, starting from the first clutch K1, gear stages i_7, i_6 and i_R are used, wherein the two subtransmissions are coupled with each other when coupling device S_ab1 is disengaged. In the reverse gear R6, starting from the second clutch K2, gear stages i_2, i_5 and _x8 are used, wherein the two subtransmissions are coupled with each other with coupling device S_ab1 being disengaged. In reverse gear R7, starting from the second clutch K2, gear stages i_2, i_7 and _x8 are used, wherein the two subtransmissions are coupled with each other with coupling device S_ab1 being disengaged. In reverse gear R8 starting from the second clutch K2, gear stages i_R, _x8 and i_5 are used, wherein the two subtransmissions are coupled with coupling device S_ab2 being disengaged.

In crawler gear C1, starting from the second clutch K2, gear stages i_2, i_5, and i_3 are used, with the two subtransmissions being coupled when winding path gear-coupling device S_ab1 is disengaged. In crawler gear C2, starting from the second clutch K2, gear stages i_2, i_7 and i_3 are used, with the two subtransmissions being coupled when coupling device S_ab1 is disengaged. In crawler gear C3 starting from the first clutch K1, gear stages i_5, i_6 and i_2 are used, with the two subtransmissions being coupled when shift element O is activated.

In overdrive gear O1 starting from the second clutch K2, gear stages i_6, i_5 and i_7 are used with the two subtransmissions being coupled by means of the activated shift element O. In overdrive gear O2 starting from the first clutch K1, gear stages i_7, i_2 and i_4 are used, with the two subtransmissions being coupled when winding path gear-coupling device S_ab1 is disengaged.

The shift patterns of the second to fourth variant embodiments according to FIGS. 3 to 8 show in detail that in the first forward gear G1, starting from the first clutch K1, gear stages i_3, i_4 and i_2 are used, wherein the coupling of the two subtransmissions occurs by means of activated shift element N. In the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stage i_8 is used.

In the shift pattern according to FIG. 4, it also is evident that gear stage i_R is used in reverse gear R1, starting from the second clutch K2. Furthermore, in the reverse gear R2, starting from the first clutch K1, gear stages i_5, _i_8 and i_R are used, with a the shift element M being activated for the coupling of the two subtransmissions. In reverse gear R3, starting from the first clutch K1, gear stages i_3, i_4 and i_R are used, wherein the two subtransmissions are coupled with each other by means of activated shift element N. In overdrive gear O1 starting from the second clutch K2, gear stages i_8, i_5 and i_7 are used, with the two subtransmissions being coupled by means of the activated shift element M. In overdrive gear O2 starting from the second clutch K2, gear stages i_4, i_3 and i_7 are used, with the two subtransmissions being coupled by means of shift element N.

From the shift patterns according to FIG. 6 it is also evident that for reverse gear R1, starting from the first clutch K1, the gear stage i_R is used. Furthermore, in the further reverse gear R2, starting from the first clutch K1, gear stages i_R, i_6 and i_2 are used, with shift element M being activated for the coupling of the two subtransmissions. In reverse gear R3, starting from the first clutch K1, the gear stages i_R, i_6 and i_8 are used, wherein the two subtransmissions are coupled together with activated shift element M. For reverse gear R4, starting from the first clutch K1, gear stages i_R, i_6 and i_4 are used, wherein the two subtransmissions are coupled with each other by activated shift element M. For reverse gear R5, starting from the second clutch K2, gear stages i_4, i_3 and i_R are used, with activated shift element N coupling the two subtransmissions together. In addition, for the overdrive gear O1, starting from the second clutch K2, gear stages i_4, i_3 and i_7 are used, wherein the two subtransmissions are coupled together by activated shift element N.

The shift pattern according to FIG. 8 shows also that in reverse gear R1, starting from the second clutch K2, gear stage i_R is used. Furthermore, for the reverse gear R2, starting from the first clutch K1, gear stages i_5, i_8 and i_R are used, with shift element M being activated for the coupling of the two subtransmissions. For reverse gear R3, starting from the first clutch K1, gear stages i_3, i_4 and i_R are used, wherein the two subtransmissions are coupled together when shift element N is activated. For crawler gear C1, starting from the first clutch K1, gear stages i_5, i_8 and i_2 are used, wherein the two subtransmissions are coupled together by activated shift element M. For overdrive gear O1, starting from the second clutch K2, gear stages i_8, i_5 and i_7 are used, with the two subtransmissions being coupled by means of activated shift element M. For overdrive gear O2, starting from the second clutch K2, gear stages i_4, i_3 and i_7 are used, wherein the two subtransmissions are coupled by means of activated shift element N.

The shift pattern of the fifth variant embodiment according to FIG. 10 shows in detail that in the first forward gear G1, starting from the first clutch K1, gear stages i_3, i_4 and i_2 are used, wherein the coupling of the two subtransmissions occurs by means of activated shift element P. In the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stage i_8 is used.

From the shift pattern according to FIG. 10, it also is evident that gear stage i_R is used in reverse gear R1, starting from the first clutch K1. Furthermore, in the reverse gear R2, starting from the second clutch K2, gear stages i_6, i_7 and i_R are used, wherein the winding path gear-coupling device S_ab1 is disengaged for the coupling of the two subtransmissions. In the crawler gear C1, starting from the first clutch K1, gear stages i_5, i_8 and i_2 are used, wherein the two subtransmissions are coupled together by means of disengaged coupling device S_ab1. In overdrive gear O1 starting from the second clutch K2, gear stages i_4, i_3 and i_7 are used with the two subtransmissions being coupled together by means of the activated shift element P. In overdrive gear O2, gear stages i_3, i_2 and i_8 are used, starting from the first clutch K1, with the two subtransmissions being coupled by means of the disengaged coupling device S_ab2.

In the shift pattern of the sixth and seventh variant embodiment according to FIGS. 11 to 14, it is shown, in detail, that in the first forward gear G1, starting from the first clutch K1, gear stages i_5, i_8 and i_2 are used, wherein the coupling of the two subtransmissions occurs by means of activated shift element N. In the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stage i_8 is used.

From the shift patterns according to FIGS. 12 and 14, it also is evident that gear stage i_R is used in reverse gear R1, starting from the second clutch K2. Furthermore, in the reverse gear R2, starting from the first clutch K2, gear stages i_3, i_4 and i_R are used, with the shift element M being activated for the coupling of the two subtransmissions. In reverse gear R3, starting from the first clutch K1, gear stages i_5, i_8 and i_R are used, with the two subtransmissions being coupled with each other by means of shift element N. In overdrive gear O1 starting from the second clutch K2, gear stages i_4, i_3 and i_7 are used with the two subtransmissions being coupled together by means of the activated shift element M. In overdrive gear O2, gear stages i_8, i_5 and i_7 are used, starting from the second clutch K1, with the coupling of the two subtransmissions occurring by means of activated shift element N.

The shift pattern of the eighth and ninth variant embodiment according to FIGS. 15 to 18 shows, in detail, that in the first forward gear G1, starting from the first clutch K1, gear stages i_7, ZW_1 and i_2 are used, wherein the coupling of the two subtransmissions occurs by means of activated shift element N. In the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stage i_8 is used.

In the shift pattern according to FIG. 16, it also is evident that gear stage i_R is used in reverse gear R1, starting from the second clutch K2. In the reverse gear R2, starting from the first clutch K1, gear stages i_5, i_8 and i_R are used, with the shift element M being activated for the coupling of the two subtransmissions. In reverse gear R3, starting from the first clutch K1, gear stages i_7, ZW_1 and i_R are used, wherein the two subtransmissions are coupled with each other by means of activated shift element N.

In contrast, the shift pattern according to FIG. 18 shows that gear stage i_R is used in reverse gear R1 starting from the first clutch K1, and gear stages ZW_1, i_7 and i_R are used in reverse gear R2, starting from the second clutch K2, with the two subtransmissions being coupled together by activated shift element N.

Moreover, the shift patterns according to FIGS. 16 and 18 show that in crawler gear C1, starting from the first clutch K1, gear stages i_5, i_8 and i_2 are used, with the two subtransmissions being coupled together by means of activated shift element M. In overdrive gear O1, starting from the second clutch K2, gear stages i_8, i_5 and i_7 are used, wherein the two subtransmissions are coupled by means of activated shift element M.

In the tenth variant embodiment according to FIGS. 19 and 20, it is evident, in detail, that in the first forward gear G1, starting from the first clutch K1, gear stages ZW_1, i_6 and i_2 are used, wherein the coupling of the two subtransmissions occurs by means of activated shift element N. In the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stage i_8 is used.

From the shift pattern according to FIG. 20, it also is evident that gear stage i_R is used in reverse gear R1, starting from the second clutch K2. Furthermore, in the reverse gear R2, starting from the first clutch K1, gear stages i_3, i_4 and i_R are used, with the shift element M being activated for the coupling of the two subtransmissions. In reverse gear R3, starting from the first clutch K1, gear stages ZW_1, i_6 and i_R are used, wherein the two subtransmissions are coupled with each other by means of activated shift element N. In overdrive gear O1 starting from the second clutch K2, gear stages i_4, i_3 and i_7 are used, with the two subtransmissions being coupled together by means of the activated shift element M. In overdrive gear O2, gear stages i_6, ZW_1 and i_7 are used, starting from the second clutch K2, with the two subtransmissions being coupled by means of shift element N when it is activated.

In the eleventh and twelfth variant embodiment, it is evident from the shift pattern according to FIGS. 21 to 24, in detail, that in the first forward gear G1, starting from the first clutch K1, gear stage i_1 is used, in the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stages i_6, ZW_8 and i_7 are used, starting from the second clutch K2, with the activated shift element N coupling the two subtransmissions together.

In the shift pattern according to FIG. 22, it is also evident that gear stage i_R is used in reverse gear R1, starting from the second clutch K2. In the reverse gear R2, starting from the second clutch K2, gear stages i_R, _i_3 and i_5 are used, with activated shift element M being used for the coupling of the two subtransmissions. In reverse gear R3, starting from the second clutch K2, gear stages i_R, i_3 and i_1 are used, wherein the two subtransmissions are coupled with each other by means of activated shift element M. In the reverse gear R4, starting from the first clutch K1, gear stages ZW_8, i_6 and i_R are used, with the two subtransmissions being coupled with each other by means of activated shift element N.

The shift pattern according to FIG. 24 shows also, that gear stage i_R is used in reverse gear R1, starting from the first clutch K1. In reverse gear R2, starting from the second clutch K2, gear stages i_6, ZW_8 and i_R are used, with the two subtransmissions being coupled together by means of activated shift element N.

In the shift patterns of the thirteenth and fourteenth variant embodiments, it is evident, in detail, according to FIGS. 25 to 28, that in the first forward gear G1, starting from the first clutch K1, gear stage i_1 is used, in the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stages ZW_8. i_3 and i_7 are used, starting from the second clutch K2, with the activated shift element N coupling the two subtransmissions together.

In the shift pattern according to FIG. 26, gear stage i_R is used in reverse gear R1, starting from the first clutch K1. In the reverse gear R2, starting from the second clutch K2, gear stages i_2, i_R and i_1 are used, with activated shift element M being used for the coupling together of the two subtransmissions. In reverse gear R3, starting from the second clutch K2, gear stages ZW_8, i_3 and i_R are used, wherein the two subtransmissions are coupled with each other by means of activated shift element N.

The shift pattern according to FIG. 28 shows also that gear stage i_R is used in reverse gear R1, starting from the first clutch K1. In reverse gear R2, starting from the second clutch K2, gear stages ZW_8, i_3 and i_R are used, with the two subtransmissions being coupled together by means of activated shift element N.

In the shift pattern of the fifteenth variant embodiment according to FIGS. 29 and 30, it is evident, in detail, that in the first forward gear G1, starting from the first clutch K1, gear stage i_1 is used, in the second forward gear G2, gear stage i_2 is used, in the third forward gear G3, gear stage i_3 is used, in the fourth forward gear G4 gear stage i_4 is used, in the fifth forward gear G5 gear stage i_5 is used, in the sixth forward gear G6 gear stage i_6 is used, in the seventh forward gear G7 gear stage i_7 is used and in the eighth forward gear G8 gear stages i_2, ZW_8. and i_7 are used, starting from the second clutch K2, with the activated shift element N being used for coupling the two subtransmissions together.

The shift pattern according to FIG. 30 shows that gear stage i_R is used in reverse gear R1, starting from the second clutch K2. In the reverse gear R2, starting from the first clutch K1, gear stages i_1, i_R and i_2 are used, with activated shift element M being used for the coupling together of the two subtransmissions. In reverse gear R3, starting from the first clutch K1, gear stages ZW_8, i_2 and i_R are used, wherein the two subtransmissions are coupled with each other by means of activated shift element N.

To summarize, in the first variant embodiment according to FIGS. 1 and 2, it is evident that the first forward gear and the eighth forward gear are realized as winding path gears by means of the gear stages of the third and fourth gear. Furthermore, three dual gear planes and one single gear plane are provided, with which the eight-speed transmission can be realized as power-shiftable without much effort, wherein the use thereof as seven-speed transmission would also be conceivable, for which the staging can be well adapted.

The first variant embodiment shows, in detail, that on the first gear plane 7-13 as dual gear plane, idler gear 7 is used for six forward gears G1, G2, C1, C2, C3, O2 and for two reverse gears R6, R7, and idler gear 13 is used for six reverse gears R1, R2, R3, R4, R5, R8. For the second gear plane 8-14 as dual gear plane, idler gear 8 is used for three forward gears G6, C3, O1 and for two reverse gears R3, R5 and idler gear 14 is used for four forward gears G1, G4, G8, O2 and for a reverse gear R4. In the third gear plane 9-15 as dual gear plane, idler gear 9 is used for four forward gears G5, C1, C3, O1 and for four reverse gears R2, R3, R6, R8 and idler gear 15 is used for five forward gears G1, G3, G8, C1, C2 and for one reverse gear R4. In the fourth gear plane 10-4 as single gear plane, idler gear 10 is used for five forward gears G7, G8, C2, O1, O2 and for two reverse gears R5, R7.

In summary, for the second, third and fourth variant embodiment according to FIGS. 3 to 8, it turns out that the first forward gear is realized as winding path gear by means of the gear stages of the third, fourth and second gear. Furthermore, three dual gear planes and two single gear planes are provided, wherein two reverse gears which are power shiftable in relation to each other are realized. Furthermore, an overdrive gear which is power shiftable to the seventh forward gear for fuel savings can be realized.

In the second variant embodiment, a balanced loading of both clutches results from the linkage of the first and third gear by means of the first clutch and the linkage of the second gear and the reverse gear by means of the second clutch, so that a similar dimensioning of the clutch can be carried out.

Detailed results for the second variant embodiment show that in the first gear plane 7-1 as single gear plane, idler gear 7 is used for two forward gears G1, G2. In the second gear plane 8-14 as dual gear plane, idler gear 8 is used for one forward gear G6, and idler gear 14 is used for three reverse gears R1, R2, R3. In the third gear plane 9-15 as dual gear plane, idler gear 9 is used for two forward gears G8, O1 and for one reverse gear R2, and idler gear 15 is used for three forward gears G1, G4, O2 and for one reverse gear R3. In the fourth gear plane 10-16 as dual gear plane, idler gear 10 is used for two forward gears G5, O1 and for one reverse gear R2 and idler gear 16 is used for three forward gears G1, G3, O2 and for one reverse gear R3. In the fifth gear plane 5-17 as single gear plane, idler gear 17 is used for three forward gears G7, O1, O2.

In the third variant embodiment according to FIGS. 5 and 6, because the second and the eighth gears are arranged on the first countershaft and thus only three idler gears are on the second countershaft, an advantage can be gained regarding arrangement of bearings on the shafts and shaft load of the second countershaft.

Detailed results in the third variant embodiment show that in the first gear plane 7-1 as single gear plane, idler gear 7 is used for two forward gears G1, G2 and for one reverse gear R2. In the second gear plane 8-2 as single gear plane, idler gear 8 is used for one forward gear G8 and for one reverse gear R3. In the third gear plane 9-15 as dual gear plane, idler gear 9 is used for one forward gear G6 and for three reverse gears R2, R3. R4, and idler gear 15 is used for three forward gears G1, G4, O1 and for two reverse gears R4, R5. In the fourth gear plane 10-16 as dual gear plane, idler gear 10 is used for five reverse gears R1 to R5, and idler gear 16 is used for three forward gears G1, G3, O1 and for one reverse gear R5.

In the fourth variant embodiment, a good accommodation of stages results from the arrangement of the sixth and seventh gear stage on single gear stages, especially in the upper gears.

Results in detail in the fourth variant embodiment show that in the first gear plane 7-13 as dual gear plane, idler gear 7 is used for three forward gears G1, G2, C1, and idler gear 13 is used for three reverse gears R1 to R3. In the second gear plane 2-14 as single gear plane, idler gear 14 is used for one forward gear G6. In the third gear plane 9-15 as dual gear plane, idler gear 9 is used for three forward gears G8, C1, O1 and for one reverse gear R2, and idler gear 15 is used for three forward gears G1, G4, O2 and for one reverse gear R3. In the fourth gear plane 10-16 as dual gear plane, idler gear 10 is used for three forward gears G5, C1, O1 and for one reverse gear C2, and idler gear 16 is used for three forward gears G1, G3, O2 and for one reverse gear R3. In the fifth gear plane 5-17 as single gear plane, idler gear 17 is used for three forward gears G7, O1, O2.

In the fifth variant embodiment according to FIGS. 9 and 10, the first forward gear is realized as winding path gear by means of the gear stages of the third, fourth and second gears, wherein four dual gear planes are provided. Furthermore, an overdrive gear power shiftable to the seventh forward gear is possible for fuel savings. Because the lower gears 2-4 and the reverse gear are arranged on the second countershaft, and the upper gears 5-8 are arranged on the first countershaft, the dimensioning of shafts and bearings for the two countershafts has advantages.

Detailed results in the fifth variant embodiment show that in the first gear plane 7-13 as dual gear plane, idler gear 7 is used for one forward gear G6 and for one reverse gear R2, and idler gear 13 is used for four forward gears G1, G2, C1 O2. In the second gear plane 8-14 as dual gear plane, idler gear 8 is used for three forward gears G8, C1, O2, and idler gear 14 is used for three forward gears G1, G4, O1. In the third gear plane 9-15 as dual gear plane, idler gear 9 is used for two forward gears G7, O1 and for one reverse gear R2, and idler gear 15 is used for four forward gears G1, G3, O1, O2 In the fourth gear plane 10-16 as dual gear plane, idler gear 10 is used for two forward gears G5, C1, and idler gear 16 is used for two reverse gears R1, R2.

According to FIGS. 11-14 in the sixth and seventh variant embodiment, a first forward gear is evident as winding path gear by means of gear stages of the fifth, eighth and second gear, with provision for three dual gear planes and two single gear planes. Moreover, two reverse gears which are power shiftable to each other and one overdrive gear which is power shiftable to the seventh forward gear are realized for fuel savings.

In the sixth variant embodiment, because of the arrangement of the gear stage of the sixth gear on single gear planes, an especially good stage accommodation results, in particular for the upper gears.

The shift pattern according to FIG. 12 shows that in the first gear plane 7-1 as single gear plane, idler gear 7 is used for one forward gear G6. In the second gear plane 8-14 as dual gear plane, idler gear 8 is used for three reverse gears R1 to R3, and idler gear 14 is used for two forward gears G1, G2. In the third gear plane 9-15 as dual gear plane, idler gear 9 is used for two forward gears G4, O1 and for one reverse gear R2, and idler gear 15 is used for three forward gears G1, G8, O2 and for one reverse gear R3. In the fourth gear plane 10-16 as dual gear plane, idler gear 10 is used for two forward gears G3, O1 and for one reverse gear R2, and idler gear 16 is used for three forward gears G1, G5, O2 and for one reverse gear R3. In the fifth gear plane 5-17 as single gear plane, idler gear 17 is used for three forward gears G7, O1, O2.

In the seventh variant embodiment, in addition, it is also evident that because of the arrangement of the second gear on a single gear plane, a better staging accommodation is realized, in particular for the lower gears.

In the seventh variant embodiment, results in detail show that in the first gear plane 1-13 as single gear plane, idler gear 13 is used for two forward gears G1, G2. In the second gear plane 8-14 as dual gear plane, idler gear 8 is used for three reverse gears R1 to R3, and idler gear 14 is used for one forward gear G6. In the third gear plane 9-15 as dual gear plane, idler gear 9 is used for two forward gears G4, O1 and for one reverse gear R2, and idler gear 15 is used for three forward gears G1, G8, O2 and for one reverse gear R3. In the fourth gear plane 10-16 as dual gear plane, idler gear 10 is used for two forward gears G3, O1 and for one reverse gear R2, and idler gear 16 is used for three forward gears G1, G5, O2 and for one reverse gear R3. In the fifth gear plane 11-5 as single gear plane, idler gear 11 is used for three forward gears G7, O1, O2.

In summary, in the eighth, ninth and tenth variant embodiments according to FIGS. 15-20, it is evident that a first forward gear is used as winding path gear by means of, among other things, the additional gear stage ZW_1, which is not used in any other forward gear. Furthermore, four dual gear planes and one single gear plane are provided. In addition, two reverse gears which are power shiftable in relation to each other can be realized.

The eighth variant embodiment according to FIGS. 15 and 16 shows that because the first and the third gear are shifted by means of the first clutch and the second gear and the reverse gear are shifted by means of the second clutch, a balanced load for both clutches results, so that a similar dimensioning of the clutches can be made.

Detailed results in the eighth variant embodiment show that in the first gear plane 7-13 as dual gear plane, idler gear 7 is used for one forward gear G4, and idler gear 13 is used for one forward gear G6. In the second gear plane 8-14 as dual gear plane, idler gear 8 is used for three reverse gears R1 to R3 and idler gear 14 is used for three forward gears G1, G2, C1. In the third gear plane 9-15 as dual gear plane, idler gear 9 is used for three forward gears G8, C1, O1 and for one reverse gear R2, and idler gear 15 is used for one forward gear G1 and for one reverse gear R3. In the fourth gear plane 10-16 as dual gear plane, idler gear 10 is used for three forward gears G5, C1, O1 and for one reverse gear R3. In the fifth gear plane 11-5 as single gear plane, idler gear 11 is used for one forward gear G3.

In the ninth variant embodiment, a smaller load for the second clutch results because of the first, third and the reverse gear being linked by means of the first clutch, so that the second clutch can be of a smaller dimension.

The ninth variant embodiment makes evident, in detail, that in the first gear plane 7-13 as dual gear plane, idler gear 7 is used for three forward gears G1, G7, O1 and for one reverse gear R2, and idler gear 13 is used for one forward gear G6. In the second gear plane 8-2 as single gear plane, idler gear 8 is used for three forward gears C1, G2, C1. In the third gear plane 9-15 as dual gear plane, idler gear 9 is used for two forward gears G8, C1 and idler gear 15 is used for one forward gear G1 and for one reverse gear R2. In the fourth gear plane 10-16 as dual gear plane, idler gear 10 is used for three forward gears G5, C1, O1 and idler gear 16 is used for three forward gears G1, G7, O1 and for one reverse gear R2. In the fifth gear plane 11-17 as dual gear plane, idler gear 11 is used for two reverse gears R1, R2 and idler gear 17 is used for one forward gear G3.

In the tenth variant embodiment, with the four dual gear planes and the one single gear plane, there is a result of two reverse gears power shiftable in relation to each other. Moreover, an overdrive gear is provided which is power shiftable to the seventh forward gear for fuel savings. A balanced load for both clutches results from the linkage of the first and the third gear by means of the first clutch, and of the second gear and the reverse gear by means of the second clutch, so that a similar dimensioning of the clutches is provided.

The tenth variant embodiment shows, in detail, that in the first gear plane 7-13 as dual gear plane, idler gear 7 is used for three reverse gears R1 to R3, and idler gear 13 is used for two forward gears G1, G2. In the second gear plane 2-14 as single gear plane, idler gear 14 is used for one forward gear G8. In the third gear plane 9-15 as dual gear plane, idler gear 9 is used for two forward gears G4, O1 and for one reverse gear R2, and idler gear 15 is used for three forward gears G1, G6, O2 and for one reverse gear R2 and idler gear 15 is used for three forward gears G1, G6, O2 and for one reverse gear R3. In the fourth gear plane 10-16 as dual gear plane, idler gear 10 is used for two forward gears G3, O1 and for one reverse gear R2, and idler gear 16 is used for two forward gears G1, O2 and for one reverse gear R3. In the fifth gear plane 11-17 as dual gear plane, idler gear 11 is used for one forward gear G5, and idler gear 17 is used for three forward gears G7, O1, O2.

To summarize, results in the eleventh and twelfth variant embodiments according to FIG. 21-24 show an eighth forward gear as winding path gear by means of the gear stage of the sixth gear, an additional gear stage ZW_8, which is not used in any other forward gear and by means of the gear stage of the left gear. Furthermore, four dual gear planes and one single gear plane are provided, wherein two reverse gears which are power shiftable in relation to each other are realized.

In the eleventh variant embodiment, a balanced load for both clutches results because the first gear and the third gear are linked by means of the first clutch, and the second gear and the reverse gear are linked by means of the second clutch, so that the clutches are similarly dimensioned. The fact that the first countershaft is loaded with the gear stages of the first, second, third, fifth and reverse gears results in a lesser load for the second countershaft, which has advantages for the dimensioning of bearings.

It is evident, in detail, from the eleventh variant embodiment that in the first gear plane 8-14 as dual gear plane, idler gear 8 is used for one forward gear G2, and idler gear 14 is used for one forward gear G4. In the second gear plane 9-15 as dual gear plane, idler gear 9 is used for four forward gears R1 to R4 and idler gear 15 is used for two forward gears G6, G8 and for one reverse gear R4. In the third gear plane 10-16 as dual gear plane, idler gear 10 is used for one forward gear G3 and for two reverse gears R2, R3 and idler gear 16 is used for one forward gear G8 and for one reverse gear R4. In the fourth gear plane 11-17 as dual gear plane, idler gear 11 is used for one forward gear G5 and for one reverse gear R2, and idler gear 17 is used for two forward gears G7, G8. In the fifth gear plane 12-6 as single gear plane, idler gear 12 is used for one forward gear G1 and for one reverse gear R3.

In the twelfth variant embodiment, it turns out that because the gear stages of the first and third gear and of the reverse gear are linked by means of the first clutch, a lesser load results in the second clutch, so that the second clutch can be of a smaller dimension.

Detailed results in the twelfth variant embodiment show that in the first gear plane 8-14 as dual gear plane, idler gear 8 is used for one forward gear G2 and idler gear 14 is used for one forward gear G4. In the second gear plane 3-15 as single gear plane, idler gear 15 is used for two forward gears G6, G8 and for one reverse gear R2. In the third gear plane 10-16 as dual gear plane, idler gear 10 is used for one forward gear G3 and idler gear 16 is used for one forward gear plane G8 and for one reverse gear R2. In the fourth gear plane 11-17 as dual gear plane, idler gear 11 is used for one forward gear G5, and idler gear 17 is used for two forward gears G7, G8. In the fifth gear plane 12-18 as dual gear plane, idler gear 12 is used for one forward gear G1 and idler gear 18 is used for two reverse gears R1, R2.

To summarize, it turns out that in the thirteenth and fourteenth variant embodiment according to FIGS. 25-28, an eighth forward gear as winding path gear is provided by means of the additional gear stage ZW_8 which is not used in any other forward gear, by means of the gear stages of the third gear and the seventh gear, wherein four dual gear planes and one single gear plane are provided. Furthermore, two reverse gears which can be power shifted relative to each other are realized.

In the thirteenth variant embodiment, a lesser load for the second countershaft results because the first countershaft is loaded by the gear stages of the first, second, fourth, fifth and the reverse gear, so that advantages are gained in the dimensioning of bearings and shafts. A reverse gear R2 which can be power shifted to the first forward gear can be realized by the optional shift element M, which makes it possible to rock a vehicle free.

In detail it is evident from the thirteenth variant embodiment that in the first gear plane 8-14 as dual gear plane, idler gear 8 is used for one forward gear G4 and idler gear 14 is used for one forward gear G6. In the second gear plane 9-15 as dual gear plane, idler gear 9 is used for one forward gear G2 and for one reverse gear R2, and idler gear 15 is used for one forward gear G8 and for one reverse gear R3. In the third gear plane 10-16 as dual gear plane, idler gear 10 is used for three reverse gears R1 to R3, and idler gear 16 is used for two forward gears G3, G8 and for one reverse gear R3. In the fourth gear plane 11-17 as dual gear plane, idler gear 11 is used for one forward gear G5 and idler gear 17 is used for two forward gears G7, G8. In the fifth gear plane 12-6 as single gear plane, idler gear 12 is used for one forward gear G1 and for one reverse gear R2.

In the fourteenth variant embodiment, it turns out that because of the arrangement of the gear stage of the reverse gear on one end of the second countershaft, there is less shaft deflection and thus some advantage in the dimensioning of bearings and shafts.

The fourteenth variant embodiment shows, in detail, that in the first gear plane 8-14 as dual gear plane, idler gear 8 is used for one forward gear G4, and idler gear 14 is used for one forward gear G6. In the second gear plane 9-15 as dual gear plane, idler gear 9 is used for one forward gear G2, and idler gear 15 is used for one forward gear G8 and for one reverse gear R2. In the third gear plane 4-16 as single gear plane, idler gear 16 is used for two forward gears G3, G8 and for one reverse gear R2. In the fourth gear plane 11-17 as dual gear plane, idler gear 11 is used for one forward gear G5, and idler gear 17 is used for two forward gears G7, G8. In the fifth gear plane 12-18 as dual gear plane, idler gear 12 is used for one forward gear G1, and idler gear 18 is used for two reverse gears R1, R2.

In the fifteenth variant embodiment according to FIGS. 29 and 30, an eighth forward gear as winding path gear is realized by means of the gear stage of the second gear, the additional gear stage ZW_8 which is not used in another forward gear, and by means of the gear stage of the seventh gear. Four dual gear planes and one single gear plane are provided, wherein two reverse gears which are power shiftable in relation to each other can be realized. Because the first countershaft is loaded with the gear stages of the first, third, fourth and the reverse gear, a more favorable load situation results for the second countershaft in spite of the five idler gears, by which advantages in the bearing and shaft dimensioning are gained. A reverse gear R2 can be realized which is shiftable to the second forward gear by means of optional shift element M, which makes it possible to rock a vehicle free.

The fifteenth variant embodiment shows, in detail, that in the first gear plane 8-14 as dual gear plane, idler gear 8 is used for one forward gear G4 and idler gear 14 is used for one forward gear G6. In the second gear plane 9-15 as dual gear plane, idler gear 9 is used for three reverse gears R1 to R3, and idler gear 15 is used for two forward gears G2, G8 and for two reverse gears R2, R3. In the third gear plane 10-16 as dual gear plane, idler gear 10 is used for one forward gear G1 and for one reverse gear R2, and idler gear 16 is used for one forward gear G8 and for one reverse gear R3. In the fourth gear plane 11-17 as dual gear plane, idler gear 11 is used for one forward gear G3 and idler gear 17 is used for one forward gear G5. In the fifth gear plane 6-18 as single gear plane, idler gear 18 is used for two forward gears G7, G8.

It is possible for at least one additional gear stage ZW_x, ZW_8 or ZW_1, for example, to be used as winding path gears in one or in a plurality of variant embodiments which are not used in a direct forward gear. The use of an additional gear stage is shown in the respective figures of the variant embodiments.

Gears x1, x2, . . . x7, x8 can be used for additional winding path gears which can be added to supplement a single gear plane, wherein the consecutive numbering of the gears x1, x2, . . . x7 occurs as follows: The consecutive numbering begins for the first gear x1 of the first countershaft w_v1, starting from the assigned output stage i_ab_1 and continuing to the fourth gear x4, wherein the first gear on the second countershaft w_v2, starting from the assigned output stage i_ab_2, is denoted by x5 and the other gears are denoted continuously to x8. If the additional gear x1, x2, . . . x7, x8 is used as part of a reverse gear transmission ratio, a rotation reversal will occur, e.g. as by the use of an intermediate gear ZR on an intermediate shaft w_zw or the like.

In all the variant embodiments of the double clutch transmission, fewer gear planes and thus fewer parts for an identical number of gears are required because of this multiple usage of individual idler gears, so that construction space and costs can be reduced advantageously.

Independent of the specific variant embodiment, the number "1" in a field of the relevant table of the shift patterns according to FIGS. 2, 4, 6, 8, 10, 12, 14, 16, 18, 20, 22, 24, 26, 28, and 30 means that the assigned clutch K1, K2, or the assigned coupling device A, B, C, D, E, F, G, H, I, J, K, L or the assigned shift element M, N, O, P is engaged or activated in each case. In contrast, an empty field in the respective table of the shift patterns according to FIGS. 2, 4, 6, 8, 10, 12, 14, 16, 18, 20, 22, 24, 26, 28 and 30 means that the assigned clutch K1, K2 or the assigned coupling device A, B, C, D, E, F, G, H, I, J, K, L or the assigned shift element M, N, O, P is disengaged in each case.

Deviating from the previously mentioned rules, for the coupling device S_ab1 or S_ab2 assigned to a power take-off gear 20 or 21, when a field is blank in the specific table of the shift patterns according to FIGS. 2, 4, 6, 8, 10, 12, 14, 16, 18, 20, 22, 24, 26, 28 and 30, coupling device S_ab1 or S_ab2 must be disengaged, and when a field is marked with the number "1" in each table of the shift patterns according to FIGS. 2, 4, 6, 8, 10, 12, 14, 16, 18, 20, 22, 24, 26, 28 and 30, the coupling device S_ab1 or S_ab2 should be engaged. Depending on the gear, coupling element S_ab1 or S_ab2 must be engaged even for a group of gears with a field marked with the number "1", while coupling element S_ab1 or S_ab2 can be either disengaged or engaged for another group of gears with a field marked with the number "1".

In addition, in many cases it is possible to introduce other coupling or shift elements without influencing the flow of power. This enables a preselection of gears.

REFERENCE CHARACTERS 1 fixed gear of the second transmission input shaft
2 fixed gear of the second transmission input shaft
3 fixed gear of the second transmission input shaft
4 fixed gear of the second transmission input shaft
5 fixed gear of the second transmission input shaft
6 fixed gear of the second transmission input shaft
7 idler gear of the first countershaft
8 idler gear of the first countershaft
9 idler gear of the first countershaft
10 idler gear of the first countershaft
11 idler gear of the first countershaft
12 idler gear of the first countershaft
13 idler gear of the second countershaft
14 idler gear of the second countershaft
15 idler gear of the second countershaft
16 idler gear of the second countershaft
17 idler gear of the second countershaft
18 idler gear of the second countershaft
19 fixed gear of the output shaft
20 power take-off gear of the first countershaft
21 power take-off gear of the second countershaft
22 torsion vibration damper
K1 first clutch
K2 second clutch
w_an drive shaft
w_ab output shaft
w_v1 first countershaft
w_v2 second countershaft
w_k1 first transmission input shaft
w_k2 second transmission input shaft
A coupling device
B coupling device
C coupling device
D coupling device
E coupling device
F coupling device
G coupling device
H coupling device
I coupling device
J coupling device
K coupling device
L coupling device
i_1 gear stage of the first forward gear
i_2 gear stage of the second forward gear
i_3 gear stage of the third forward gear
i_4 gear stage of the fourth forward gear
i_5 gear stage of the fifth forward gear
i_6 gear stage of the sixth forward gear
i_7 gear stage of the seventh forward gear
i_8 gear stage of the eighth forward gear
i_R gear stage reverse gear ZW_1 additional gear stage for winding path gears
ZW_8 additional gear stage for winding path gears
_x8 gear for additional winding path gears
i_ab_1 output stage on the first countershaft
i_ab_2 output stage on the second countershaft
G1 first forward gear
G2 second forward gear
G3 third forward gear
G4 fourth forward gear
G5 fifth forward gear
G6 sixth forward gear
G7 seventh forward gear
G8 eighth forward gear
C1 crawler gear
C2 crawler gear
C3 crawler gear
O1 overdrive gear
O2 overdrive gear
R1 reverse gear
R2 reverse gear
R3 reverse gear
R4 reverse gear
R5 reverse gear
R6 reverse gear
R7 reverse gear
R8 reverse gear
w_zw intermediate shaft
ZR intermediate gear for rotation reversal
ZS utilized gear stage
M shift element optional
N shift element
O shift element optional
P shift element
S_ab1 coupling device on the output stage optional
S_ab2 coupling device on the output stage optional
lsb. power shiftable

The invention claimed is:

1. A double clutch transmission comprising:
first and second clutches (K1, K2), each comprising an input side connected to a drive shaft (w_an) and an output side respectively connected to one of first and second transmission input shafts (w_K1, w_K2) arranged coaxially with each other;
toothed idler gearwheels (7, 8, 9, 10, 11, 12, 13, 14, 15, 16, 17, 18) being situated on the first and second countershafts (w_v1, w_v2) such that the toothed idler gearwheels rotate;
toothed fixed gearwheels (1, 2, 3, 4, 5, 6) being arranged on the first and the second transmission input shafts (w_k1, w_k2) in a rotationally fixed manner, and each one of the toothed fixed gearwheels (1, 2, 3, 4, 5, 6) at least partially meshing with at least one of the idler gearwheels (7, 8, 9, 10, 11, 12, 13, 14, 15, 16, 17, 18);
a plurality of coupling devices (A, B, C, D, E, F, G, H, I, J, K, L) for the coupling one of the idler gearwheels (7, 8, 9, 10, 11, 12, 13, 14, 15, 16, 17, 18) to one of the first and the second countershafts (w_v1, w_v2) in a rotationally fixed manner;
the first and the second countershafts (w_v1, w_v2) each supporting a power take-off gear (20, 21) meshing with a gearing of an output shaft (w_ab); and
at least one shift element (N, P) for connection in a rotationally fixed manner of two toothed idler gearwheels such that at least a plurality of power-shiftable forward gears (1, 2, 3, 4, 5, 6, 7, 8) and at least one reverse gear (R1, R2, R3, R4, R5, R6, R7, R8) are shiftable;
wherein a maximum of five gear planes (1-13, 7-1, 7-13, 8-2, 2-14, 8-14, 3-15, 9-15, 4-16, 10-4, 10-16, 5-17, 11-5, 11-17, 12-6, 6-18, 12-18) are provided, at least three of the five gear planes are dual gear planes (7-13, 8-14, 9-15, 10-16, 11-17, 12-18) and for each dual gear plane (7-13, 8-14, 9-15, 10-16, 11-17, 12-18), one idler gearwheel (7, 8, 9, 10, 11, 12, 13, 14, 15, 16, 17, 18) of the first and second countershafts (w_v1, w_v2) meshes with one fixed gearwheel (1, 2, 3, 4, 5, 6) of one of the first and the second transmission input shafts (w_k1, w_k2), and
for at least one of the dual gear planes (7-13, 8-14, 9-15, 10-16, 11-17, 12-18), at least one idler gearwheel (7, 8, 9, 10, 11, 12, 13, 14, 15, 16, 17, 18) can be used for at least two gears so that at least one power-shiftable winding path gear is shiftable by the at least one shift element (N, P).

2. The double clutch transmission according to claim 1, wherein an idler gearwheel (15) of a second subtransmission is connectable to an idler gearwheel (16) of a first subtransmission so that by activation of the at least one shift element (N), supported on the second countershaft (w_v2), at least one of a first forward gear (G1) and an eighth forward gear (G8) is shiftable as the winding path gear.

3. The double clutch transmission according to claim 1, wherein an idler gearwheel (14) of a second subtransmission is connectable to idler gearwheel (15) of a first subtransmission by activation of the at least one shift element (P), supported on the second countershaft, so that at least one of a first forward gear (G1) and an eighth forward gear (G8) is shiftable as the winding path gear.

4. The double clutch transmission according to claim 1, wherein the double clutch transmission has three dual gear planes and one single gear plane, a first gear plane (7-13) and a second gear plane (8-14) are each dual gear planes and include a fixed gearwheel (1 or 2) of the second transmission input shaft (w_k2) of a second subtransmission, and a third gear plane (9-15) is a dual gear plane and a fourth gear plane (10-4) is a single gear plane and each respectively include a fixed gearwheel (3 or 4) of the first transmission input shaft (w_k1) of a first subtransmission.

5. The double clutch transmission according to claim 1, wherein the double clutch transmission has three dual gear planes and two single gear planes, a first gear plane (1-13, 7-1; 7-13) is one of a single gear plane and a dual gear plane, a second gear plane (2-14, 8-2; 8-14,) is one of a single gear plane and a dual gear plane, and a third gear plane (9-15) is a dual gear plane which include a fixed gearwheel (1, 2 or 3) of the second transmission input shaft (w_k2) of a second subtransmission, and a fourth gear plane (10-16) is a dual gear plane and a fifth gear plane (5-17, 11-5, 11-17) is one of a single gear plane and a dual gear plane which each include a fixed gearwheel (4 or 5) of the first transmission input shaft (w_k1) of a first subtransmission.

6. The double clutch transmission according to claim 1, wherein the double clutch transmission has four dual gear planes, a first gear plane (7-13) is a dual gear plane and a second gear plane (8-14) is a dual gear plane which each include a fixed gearwheel (1 or 2) of the second transmission input shaft (w_k2) of a second subtransmission, and a third gear plane (9-15) is a dual gear plane and a fourth gear plane (10-16) is a dual gear plane which each include a fixed gearwheel (3, 4) of the first transmission input shaft (w_k1) of a first subtransmission.

7. The double clutch transmission according to claim 1, wherein the double clutch transmission has four dual gear planes and one single gear plane, a first gear plane (8-14) is a dual gear plane and a second gear plane (3-15; 9-15) is one of a single gear plane and a dual gear plane which each include a fixed gearwheel (2 or 3) of the second transmission input shaft (w_k2) of a second subtransmission, and a third gear plane (4-16; 10-16) is one of a single gear plane and a dual gear plane, a fourth gear plane (11-17) is a dual gear plane and a fifth gear plane (12-6; 12-18, 6-18) is one of a single gear plane and a dual gear plane which each include a fixed gearwheel (4, 5, 6) of the first transmission input shaft (w_k1) of a first subtransmission.

8. The double clutch transmission according to claim 1, wherein the double clutch transmission has four dual gear planes and one single-gear plane, a first gear plane (7-13) is a dual gear plane, a second gear plane (8-2, 2-14; 8-14) is one of a single gear plane and a dual gear plane, and a third gear plane (9-15) is a dual gear plane which each include a fixed gearwheel (1, 2 or 3) of the second transmission input shaft (w_k2) of a second subtransmission, and a fourth gear plane (10-16) is a dual gear plane and a fifth gear plane (11-5, 11-17) is one of a single gear plane and a dual gear plane which each include a fixed gearwheel (4 or 5) of a first transmission input shaft (w_k1) of the first subtransmission.

* * * * *